United States Patent
Ahmed et al.

(10) Patent No.: US 12,271,257 B2
(45) Date of Patent: Apr. 8, 2025

(54) C-PHY RECEIVER CORRUPT POST PATTERN FILTER

(71) Applicant: QUALCOMM Incorporated, San Diego, CA (US)

(72) Inventors: Yasser Ahmed, San Diego, CA (US); Sachin Ajit Devamare, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 240 days.

(21) Appl. No.: 17/986,631

(22) Filed: Nov. 14, 2022

(65) Prior Publication Data

US 2024/0160516 A1 May 16, 2024

(51) Int. Cl.
*H04L 7/00* (2006.01)
*G06F 11/07* (2006.01)
*H04L 25/03* (2006.01)
*H04L 25/14* (2006.01)

(52) U.S. Cl.
CPC ........ *G06F 11/079* (2013.01); *G06F 11/0745* (2013.01); *H04L 25/03057* (2013.01); *H04L 25/14* (2013.01)

(58) Field of Classification Search
CPC .............. G06F 11/079; G06F 11/0745; H04L 25/03057; H04L 25/14
USPC ................ 375/368, 360, 359, 219, 295, 316
See application file for complete search history.

(56) References Cited

U.S. PATENT DOCUMENTS

| 2006/0001769 A1* | 1/2006 | Wang ........................ H04N 5/08 348/E5.017 |
| 2010/0246699 A1 | 9/2010 | Moriizumi |
| 2015/0271037 A1 | 9/2015 | Wiley |

FOREIGN PATENT DOCUMENTS

JP H09102781 A 4/1997

OTHER PUBLICATIONS

International Search Report and Written Opinion—PCT/US2023/075721—ISA/EPO—Mar. 22, 2024.

* cited by examiner

*Primary Examiner* — Zewdu A Kassa
(74) *Attorney, Agent, or Firm* — Loza & Loza, LLP/Qualcomm

(57) ABSTRACT

A communication interface circuit has a shift register configured to convert a serial stream of 3-bit symbols to a parallel multi-symbol word comprising a plurality of symbols ordered in accordance with time of arrival at an input of the shift register; a set of symbol comparators, each symbol comparator being configured to determine whether a pattern of symbols in the parallel multi-symbol word indicates presence of a false synchronization pattern in the serial stream of 3-bit symbols; and a synchronization detection circuit configured to provide a control signal that is active when a synchronization pattern is detected in the serial stream of 3-bit symbols, and further configured to suppress the control signal when at least one of the set of symbol comparators indicates the presence of the false synchronization pattern of 3-bit symbols.

30 Claims, 11 Drawing Sheets

C-PHY RECEIVER CORRUPT POST PATTERN FILTER

TECHNICAL FIELD

The present disclosure relates generally to serial communication over a serial bus in a wireless communication device and, more particularly, to detection of errors in control signaling in a C-PHY interface.

BACKGROUND

Mobile communication devices typically include a variety of components such as circuit boards, integrated circuit (IC) devices, application-specific integrated circuit (ASIC) devices and/or System-on-Chip (SoC) devices. The types of components may include processing circuits, user interface components, storage and other peripheral components that communicate over a serial bus. The serial bus may be operated in accordance with a standardized or proprietary protocol. In one example, the serial bus can be operated in accordance with an Inter-Integrated Circuit (I2C or I²C) communication protocol. The I2C bus is configured as a multi-drop bus and was developed to connect low-speed peripherals to a processor. The two wires of an I2C bus include a Serial Data Line (SDA) that carries a data signal, and a Serial Clock Line (SCL) that carries a clock signal.

Multiple standards are defined for interconnecting certain types of components in mobile communication devices. For example, different types of interfaces may be used for communication between an application processor and display or camera components in a mobile communication device. Some display or camera components employ an interface that conforms to standards or protocols specified by the MIPI Alliance for a camera serial interface (CSI) and a display serial interface (DSI).

The MIPI Alliance DSI, DSI-2 (referred to individually or collectively herein as DSI) and CSI and CSI-2 (referred to individually or collectively herein as CSI) standards define wired interfaces that can be deployed within an IC or between some combination of IC devices and SoC devices. CSI protocols may be used to couple a camera and application processor. DSI protocols may be used to couple an application processor and display subsystem. The low-level physical-layer (PHY) interface in each of these applications can be implemented in accordance with MIPI Alliance C-PHY or D-PHY standards and protocols. High-speed modes and low-power modes of communication are defined for C-PHY and D-PHY interfaces. The C-PHY high-speed mode uses a low-voltage multiphase signal transmitted in different phases on a 3-wire link. The D-PHY high-speed mode uses multiple 2-wire lanes to carry low-voltage differential signals. The low-power modes of C-PHY and D-PHY interfaces provide lower rates than the high-speed modes and transmit signals at higher voltages.

As device technology improves, a combination of demand for higher data rates over serial buses have been met in some instances by increasing the clock rates used to control signaling over serial interfaces. For example, the version 2.0 specification for MIPI C-PHY interfaces provides for transmission clock rates of between 4.5 GHz and 6.0 GHz. Increasing transmission clock frequencies can decrease the tolerances and margins defined for data signals. Certain control patterns transmitted during C-PHY transactions may be more easily corrupted when transmission clock rates and a failure to detect or respond to such corruptions may result in loss of data throughput over the C-PHY interface. For these and other reasons, there is an ongoing need to improve error detection in C-PHY interfaces.

SUMMARY

Certain aspects of the disclosure relate to systems, apparatus, methods and techniques that enable mobile communication devices and other portable devices to detect and ignore false control signals caused by corrupted transmissions over a C-PHY three-wire communication link.

In various aspects of the disclosure, a communication interface circuit includes a shift register configured to convert a serial stream of 3-bit symbols to a parallel multi-symbol word that includes a plurality of symbols ordered in accordance with time of arrival at an input of the shift register; a set of symbol comparators, each symbol comparator being configured to determine whether a pattern of symbols in the parallel multi-symbol word indicates presence of a false synchronization pattern in the serial stream of 3-bit symbols; and a synchronization detection circuit configured to provide a control signal that is active when a synchronization pattern is detected in the serial stream of 3-bit symbols, and further configured to suppress the control signal when at least one of the set of symbol comparators indicates the presence of the false synchronization pattern of 3-bit symbols.

In various aspects of the disclosure, a method for operating a communication interface circuit includes configuring a shift register to convert a serial stream of 3-bit symbols to a parallel multi-symbol word that includes a plurality of symbols ordered in accordance with time of arrival at an input of the shift register; configuring each symbol comparator in a set of symbol comparators to determine whether a pattern of symbols in the parallel multi-symbol word indicates presence of a false synchronization pattern in the serial stream of 3-bit symbols; configuring a synchronization detection circuit to provide a control signal that is active when a synchronization pattern is detected in the serial stream of 3-bit symbols; and suppressing the control signal when at least one of the set of symbol comparators indicates the presence of the false synchronization pattern of 3-bit symbols.

In various aspects of the disclosure, an apparatus includes means for converting a serial stream of 3-bit symbols to a parallel multi-symbol word that includes a plurality of symbols ordered in accordance with time of arrival at an input of the means for converting the serial stream of 3-bit symbols to the parallel multi-symbol word; means for comparing sequences of symbols, the means for comparing the sequences of symbols including a set of symbol comparators in which each symbol comparator is configured to determine whether a pattern of symbols in the parallel multi-symbol word indicates presence of a false synchronization pattern in the serial stream of 3-bit symbols; and means for a detecting synchronization patterns configured to provide a control signal that is active when a synchronization pattern is detected in the serial stream of 3-bit symbols, and further configured to suppress the control signal when at least one of the set of symbol comparators indicates the presence of the false synchronization pattern of 3-bit symbols.

In various aspects of the disclosure, a processor-readable storage medium includes code for configuring a shift register to convert a serial stream of 3-bit symbols to a parallel multi-symbol word that includes a plurality of symbols ordered in accordance with time of arrival at an input of the shift register; configuring each symbol comparator in a set of symbol comparators to determine whether a pattern of symbols in the parallel multi-symbol word indicates presence of a false synchronization pattern in the serial stream of 3-bit symbols; configuring a synchronization detection circuit to provide a control signal that is active when a synchronization pattern is detected in the serial stream of 3-bit symbols; and suppressing the control signal when at least one of the set of symbol comparators indicates the presence of the false synchronization pattern of 3-bit symbols.

In certain aspects, each symbol in the serial stream of 3-bit symbols represents a transition in signaling state of a three-wire differential serial communication link. A synchronization pattern transmitted over the three-wire differential serial communication link may include a sequence of symbols that each have a first value followed in transmission by a symbol that has a second value. In one example, the false synchronization pattern includes a corrupted symbol that has the second value and the corrupted symbol may be followed in transmission by a sequence of symbols that each have the first value. In some examples, the corrupted symbol is included in a POST pattern configured in accordance with a C-PHY protocol.

In certain aspects, the symbol comparators in the set of symbol comparators receive different sequences of the parallel multi-symbol word. In certain aspects, a demapper may be configured to output a 16-bit data word that is mapped to seven symbols in the parallel multi-symbol word.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Data communication links employed by SoCs and other IC devices to connect processors with modems and other peripherals may be operated in accordance with industry or proprietary standards or protocols associated with certain functions or types of devices. In the example of display panels, display subsystems, and display drivers, communication standards and protocols defined by the MIPI Alliance are frequently used. The Display Serial Interface (DSI®), for example, provides C-PHY and D-PHY standards and protocols used to define, configure and control a high-speed serial interface between a host processor and a display module.

According to certain aspects of the disclosure, a serial data link may be used to interconnect electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, a drone, a multicopter, or any other similar functioning device.

Figure 1:
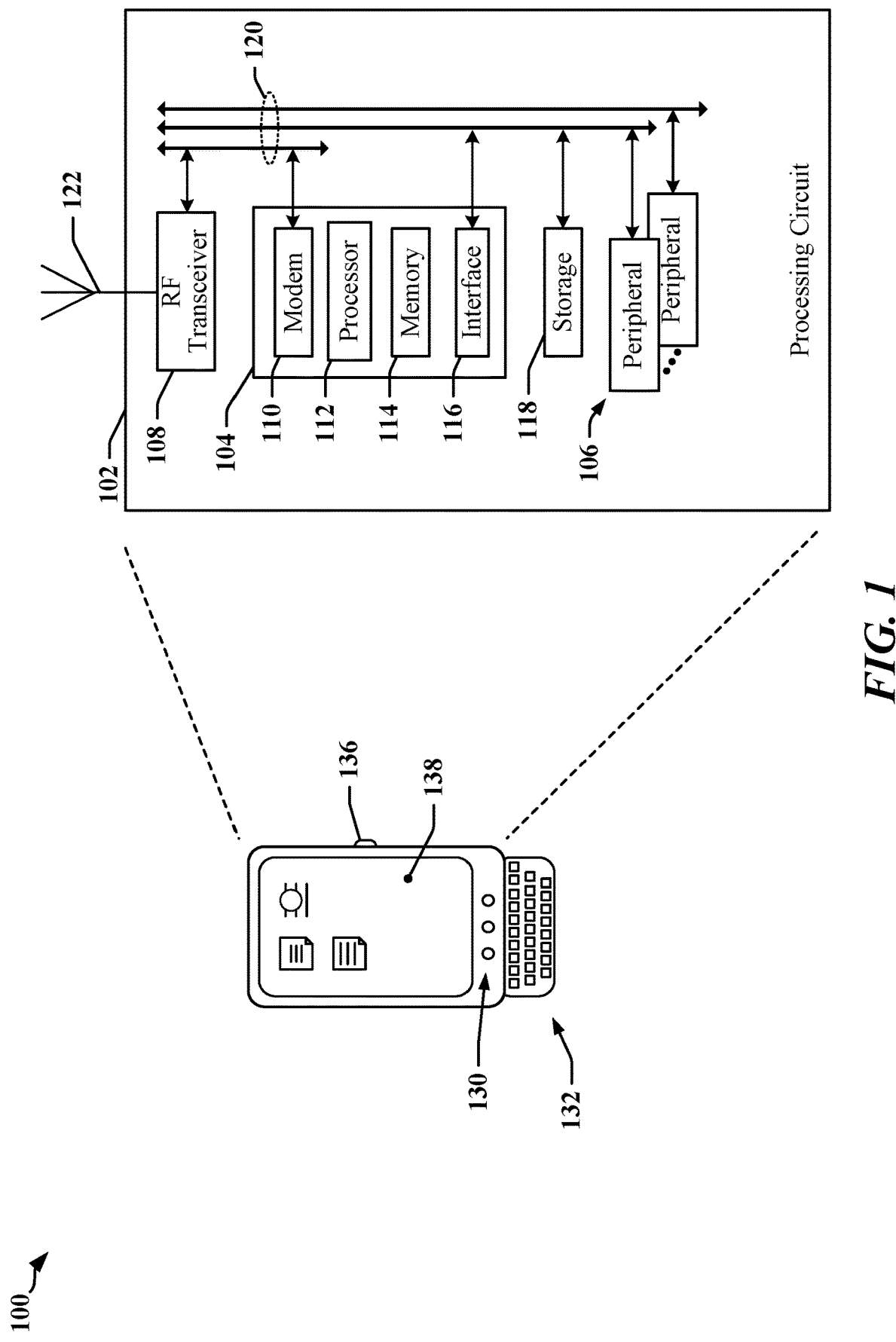
FIG. 1 illustrates an apparatus employing a data link between IC devices and that is selectively operated according to a standard or proprietary protocol.

FIG. 1 illustrates an example of an apparatus 100 that includes multiple devices or circuits coupled through one or more data communication buses. A processing circuit 102 of the apparatus 100 includes multiple circuits or devices 104, 106 and/or 108. In some examples, the processing circuit 102 is implemented using one or more ASICs. In other examples, the processing circuit 102 is implemented in an SoC. In one example, the apparatus 100 may be configured to operate as a communication device and the processing circuit 102 includes an ASIC 104, one or more peripheral devices 106, and a transceiver 108 that cooperate to enable the apparatus to communicate through an antenna 122 with a radio access network, a core access network, the Internet and/or another network.

The ASIC 104 may have one or more processors 112, one or more modems 110, on-board memory 114, a bus interface circuit 116 and/or other logic circuits or functions. The processing circuit 102 may be controlled by an operating system that provides an application programming interface (API) layer that enables the one or more processors 112 to execute software modules residing in the on-board memory 114 or other processor-readable storage 118 provided on the processing circuit 102. The software modules may include instructions and data stored in the on-board memory 114 or processor-readable storage 118. The ASIC 104 may access its on-board memory 114, the processor-readable storage 118, and/or storage external to the processing circuit 102. The on-board memory 114, the processor-readable storage 118 may include read-only memory (ROM) or random-access memory (RAM), electrically erasable programmable ROM (EEPROM), flash cards, or any memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as the antenna 122, a display 138, operator controls, such as switches or buttons 136, 130 and/or an integrated or external keypad 132, among other components. A user interface module may be configured to operate with the display 138, external keypad 132, etc. through a dedicated communication link or through one or more serial data interconnects.

The processing circuit 102 may provide multiple buses 120 that enable communication between two or more devices 104, 106, and/or 108. In one example, the ASIC 104 may include bus interface circuits 116 coupled to one or more of the buses 120. Each of the bus interface circuits 116 may include a combination of circuits, counters, timers, control logic and other configurable circuits or modules. In one example, certain bus interface circuits 116 may be configured to operate in accordance with standards-defined communication specifications or protocols. The processing circuit 102 may include or control a power management function that configures and manages the operation of the apparatus 100.

Figure 2:
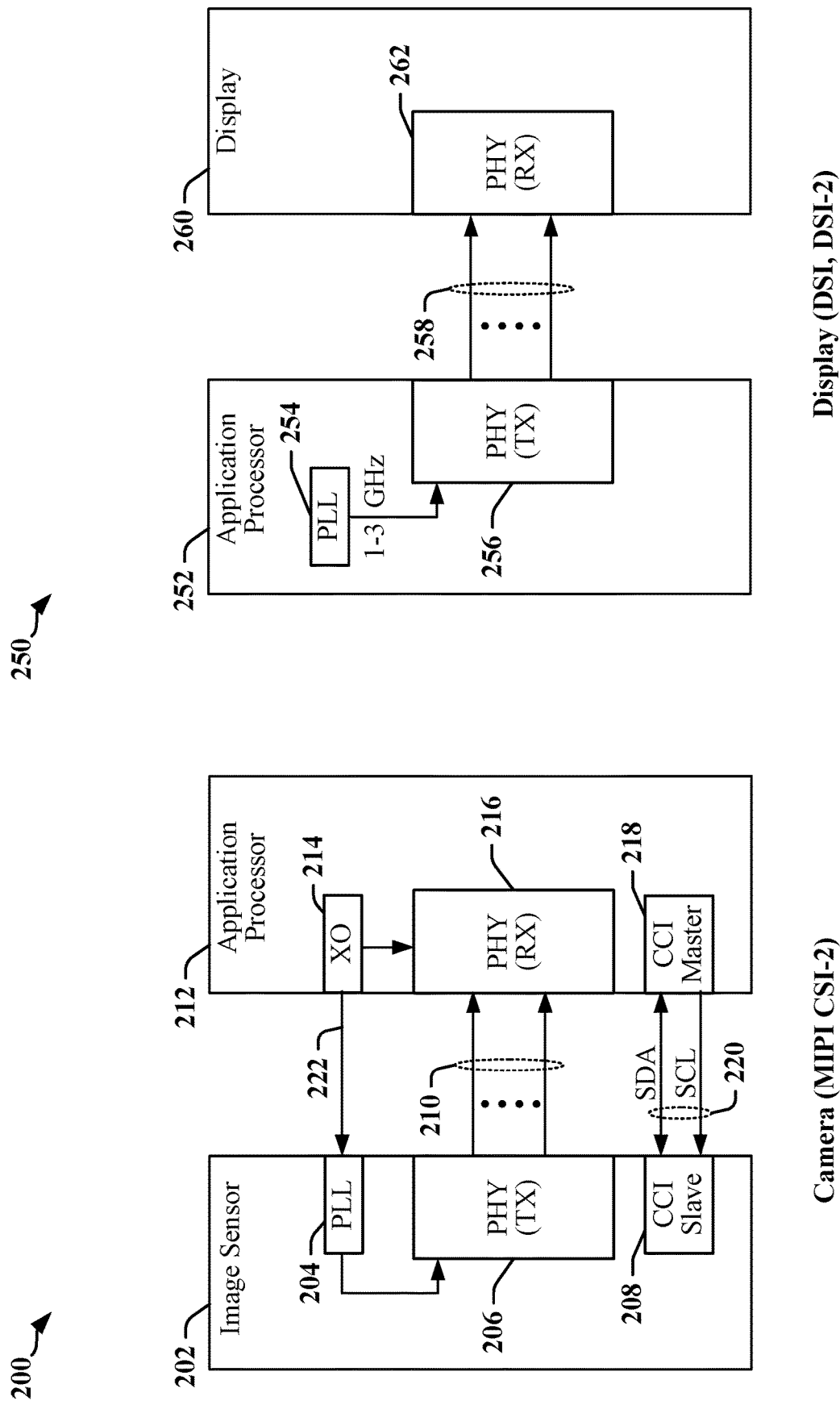
FIG. 2 illustrates examples of interface circuits that may be adapted in accordance with certain aspects of this disclosure.

FIG. 2 illustrates examples of interface circuits that may be employed or adapted in accordance with certain aspects of this disclosure. A first interface circuit is configured as a camera subsystem 200 and a second interface circuit is configured as a display subsystem 250. The interface circuits may be deployed in a mobile communication device, for example. The camera subsystem 200 may include a CSI-2 defined communication link between an image sensor 202 and an application processor 212. The communication link may include a high-data rate data transfer link 210 used by the image sensor 202 to transmit image data to the application processor 212 using a transmitter 206. The high-data rate data transfer link 210 may be configured and operated according to C-PHY protocols. The application processor 212 may include a crystal oscillator (XO 214) or other clock source to generate a clock signal 222 that controls the operation of the transmitter 206. The clock signal 222 may be processed by a phase-locked loop (PLL) 204 in the image sensor 202. In some instances, the clock signal 222 may also be used by the C-PHY receiver 216 in the application processor 212. The communication link may include a Camera Control Interface (CCI), which is similar in nature to the Inter-Integrated Circuit (I2C) interface. The CCI bus may include a Serial Clock (SCL) line that carries a clock signal and a Serial Data (SDA) line that carries data. The CCI link 220 may be bidirectional and may operate at a lower data rate than the high-data rate data transfer link 210. The CCI link 220 may be used by the application processor 212 to exchange control and configuration information with the image sensor 202. The application processor 212 may include a CCI bus master 218 and the image sensor 202 may include a CCI slave 208.

The display subsystem 250 may include a unidirectional data link 258 that can be configured and operated according to C-PHY protocols. In the application processor 252, a clock source such as the PLL 254 may be used to generate a bit clock signal used by a C-PHY receiver 256 to control transmissions on the data link 258. At the display device 260, a C-PHY receiver 262 may extract embedded clock information from sequences of symbols transmitted on the data link, or from a clock lane provided in the data link 258.

Certain aspects disclosed herein relate to systems, apparatus and methods that support a broad range of interface protocols, and that can operate using different physical media.

As shown in FIG. 2, for example, the camera subsystem 200 and/or display subsystem 250 may communicate high data rate information using C-PHY protocols. In some configurations, the camera subsystem 200 and/or display subsystem 250 may communicate using a reverse channel (e.g., the CCI link 220) for configuration of an image sensor 202 or other device. In some instances, a low-power mode of operation may be defined for links that use either C-PHY protocols.

Figure 3:
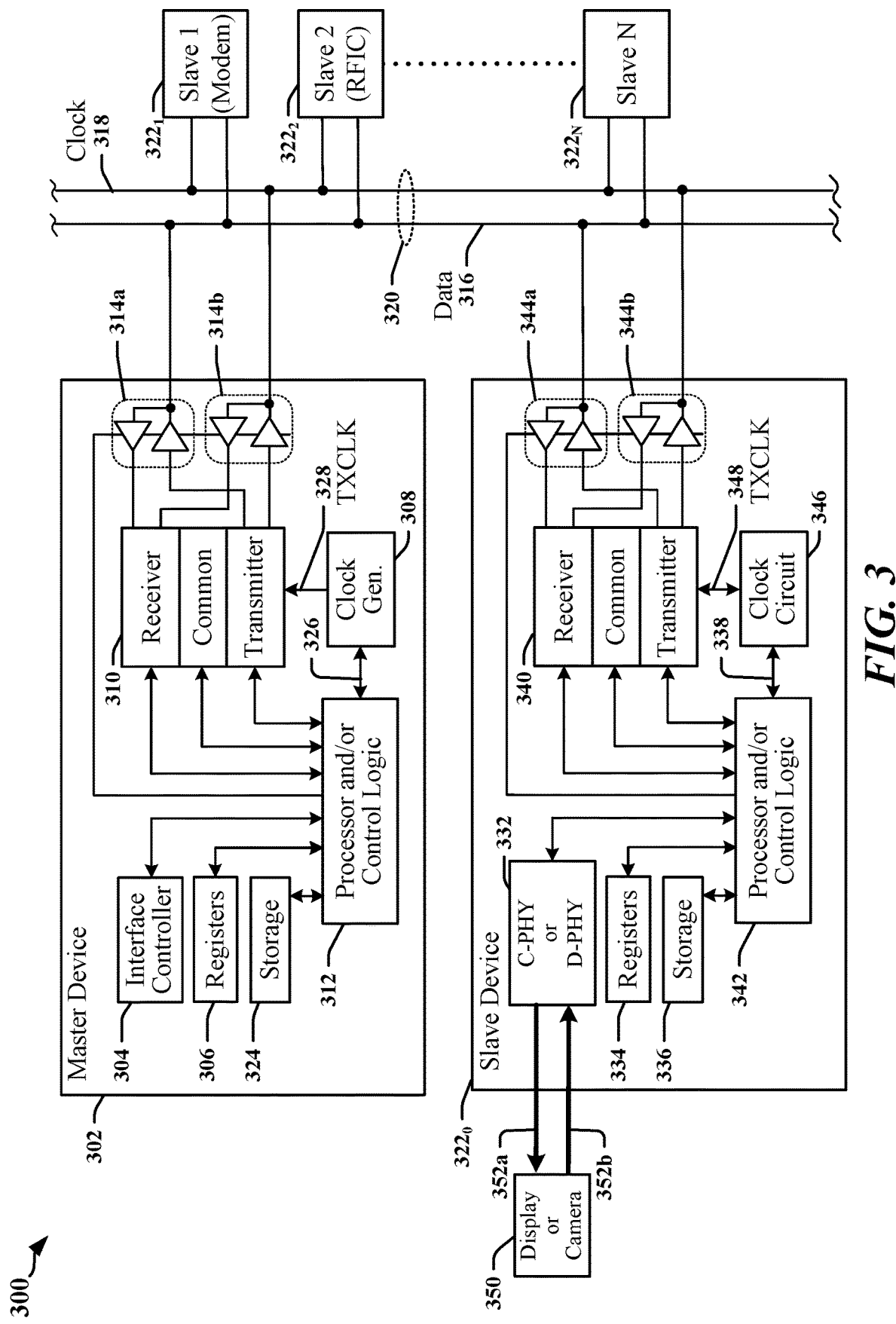
FIG. 3 illustrates a system architecture for an apparatus employing a C-PHY data link between IC devices.

FIG. 3 illustrates an example of an apparatus 300 employing a data link that may be used to communicatively couple two or more devices, subcomponents or circuits. Here, the apparatus 300 includes multiple devices 302, and $322_0$-$322_N$ coupled to a two-wire serial bus 320. The devices 302 and $322_0$-$322_N$ may be implemented in one or more semiconductor IC devices, such as an application processor, SoC or ASIC. In various implementations certain of the devices 302 and 3220-322N may include, support or operate as a modem, a signal processing device, a display driver, a camera, a user interface, a sensor, a sensor controller, a media player, a transceiver, and/or other such components or devices. In some examples, one or more devices $322_0$-$322_N$ may be used to control, manage or monitor a sensor device. Communication between devices 302 and $322_0$-$322_N$ over the serial bus 320 is controlled by a bus master device 302. Certain types of bus can support multiple bus masters 302.

In one example, a bus master device 302 includes an interface controller 304 that may be configured to manage access to the serial bus, configure dynamic addresses for slave devices and/or generate a clock signal 328 to be transmitted on a clock line 318 of the serial bus 320. The bus master device 302 may include configuration registers 306 or other storage 324, and other control logic 312 configured to handle protocols and/or higher-level functions. The control logic 312 may include a processing circuit such as a state machine, sequencer, signal processor or general-purpose processor. The bus master device 302 includes a transceiver 310 and line drivers/receivers 314a and 314b. The transceiver 310 may include receiver, transmitter and common circuits, where the common circuits may include timing, logic and storage circuits and/or devices. In one example, the transmitter encodes and transmits data based on timing in the clock signal 328 provided by a clock generation circuit 308. Other timing clocks 326 may be used by the control logic 312 and other functions, circuits or modules.

At least one device $322_0$-$322_N$ may be configured to operate as a slave device on the serial bus 320 and may include circuits and modules that support a display, an image sensor, and/or circuits and modules that control and communicate with one or more sensors that measure environmental conditions. In one example, a device $322_0$ configured to operate as a slave device may provide a control function, physical layer circuit 332 that includes circuits and modules to support a display, an image sensor, and/or circuits and modules that control and communicate with one or more sensors that measure environmental conditions. In this example, the device $322_0$ can include configuration registers 334 or other storage 336, control logic 342, a transceiver 340 and line drivers/receivers 344a and 344b. The control logic 342 may include a processing circuit such as a state machine, sequencer, signal processor or general-purpose processor. The transceiver 340 may include receiver, transmitter and common circuits, where the common circuits may include timing, logic and storage circuits and/or devices. In one example, the transmitter encodes and transmits data based on timing in a clock signal 348 provided by clock generation and/or recovery circuits 346. In some instances, the clock signal 348 may be derived from a signal received from the clock line 318. Other timing clocks 338 may be used by the control logic 342 and other functions, circuits or modules.

The serial bus 320 may be operated in accordance with standards defined protocol or proprietary protocol. In some instances, two or more devices 302, $322_0$-$322_N$ may be configured to operate as a bus master device on the serial bus 320. In some instances, the apparatus 300 includes multiple serial buses 320, 352a and/or 352b that couple two or more of the devices 302, $322_0$-$322_N$ or one of the devices 302, $322_0$-$322_N$ and a peripheral device such as a display or camera 350 or a Radio-Frequency IC (RFIC). In some examples, one slave device $322_0$ is configured to operate as a display or camera coupled to a display or camera 350. The latter slave device $322_0$ may include a physical layer circuit 332 that is configured to operate as a C-PHY interface controller that communicates with the display or camera 350 over a serial bus 352a or 352b operated in accordance with a C-PHY protocol.

In certain aspects of this disclosure, systems and apparatus may employ multi-phase data encoding and decoding interface methods for communicating between IC devices. A multi-phase encoder may drive a plurality of conductors (i.e., 3 conductors). Each conductor may be referred to as a wire, although the conductors may include conductive traces on a circuit board or traces or interconnects within a conductive layer of a semiconductor IC device. In one example, a physical layer interface implemented using MIPI Alliance-defined C-PHY technology and protocols (i.e., a C-PHY interface) may be used to connect camera or display to an application processor. The C-PHY interface employs three-phase symbol encoding to transmit data symbols on 3-wire lanes, or "trios" where each trio includes an embedded clock. A trio may be referred to as a lane herein. A multi-lane C-PHY communication channel may be established using multiple trios to carry data exchanged between a pair of devices, where each channel includes one trio that carries a portion of the data, which may be independently encoded in accordance with C-PHY protocols.

The C-PHY interface provides a three-phase encoding scheme for a three-wire system. The three-phase encoding scheme defines three phase states and two polarities, providing 6 states and 5 possible transitions from each state. Deterministic voltage and/or current changes may be detected and decoded to extract data from the three wires.

Figure 4:
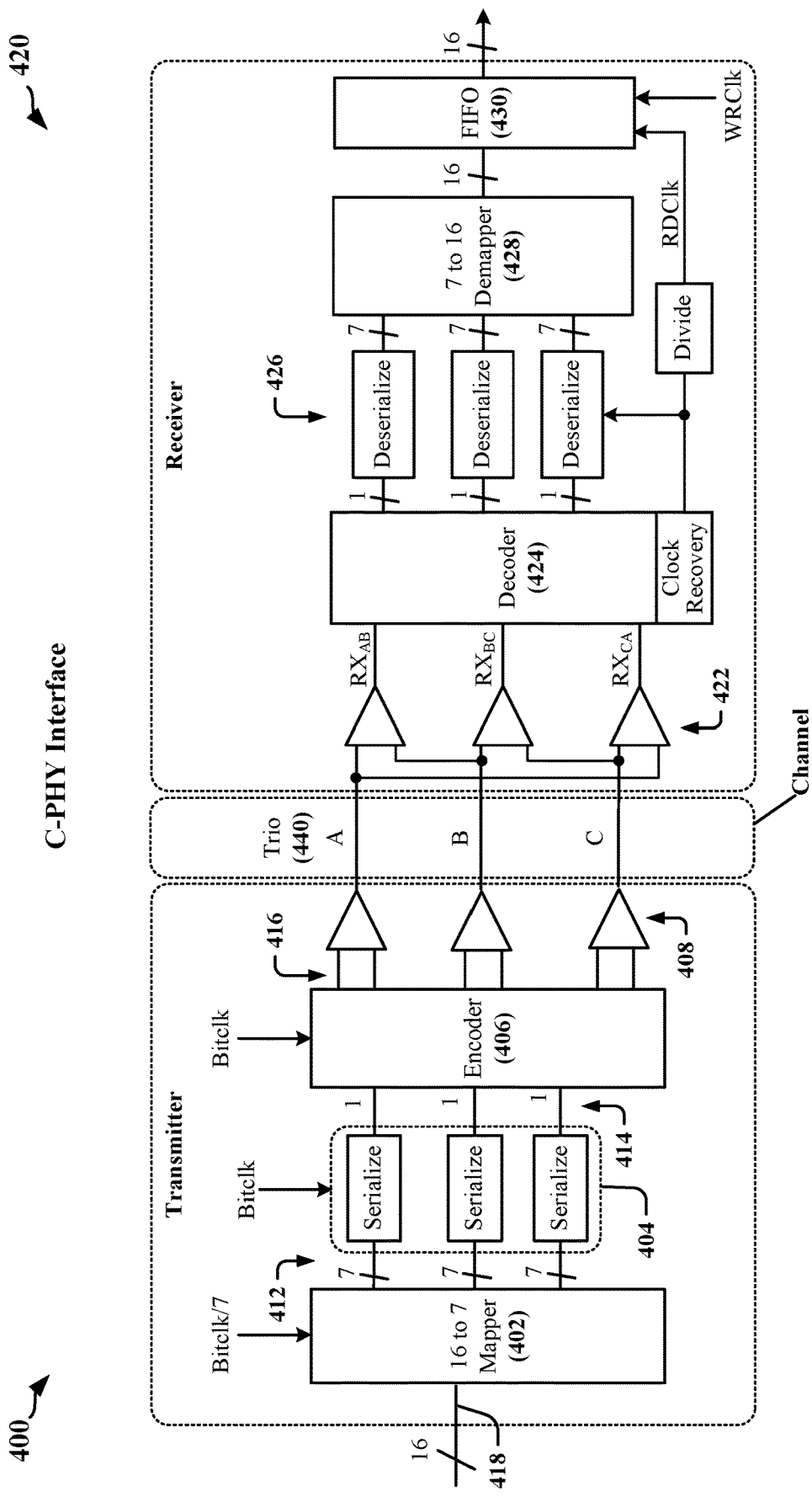
FIG. 4 illustrates an example of a C-PHY interface that may be adapted according to certain aspects disclosed herein.

FIG. 4 illustrates a C-PHY interface that may be used to implement certain aspects of the serial bus 352a or 352b depicted in FIG. 3. The illustrated example may relate to a three-wire link configured to carry three-phase polarity encoded data in accordance with DSI protocols. The use of 3-phase polarity encoding provides for high-speed data transfer and may consume half or less of the power of other interfaces at the desired operating frequency because fewer than 3 drivers are active at any time in a C-PHY link. The C-PHY interface uses 3-phase polarity encoding to encode multiple bits per symbol transition on the three-wire link. In one example, a combination of three-phase encoding and polarity encoding may be used to support a wide video graphics array (WVGA), 80 frames per second liquid crystal display driver IC without a frame buffer, delivering pixel data for display refresh at 810 Mbps over three or more wires.

In the depicted C-PHY interface, three-phase polarity encoding is used to control signaling state of connectors, wires, traces and other interconnects that provide a channel for communication. In the illustrated example, a single unidirectional channel, or lane, is provided using a combination of three wires (the trio 440). Each wire in the trio 440 may be undriven, driven positive, or driven negative in any symbol transmission interval. In some instances, an undriven signal wire of the trio 440 may be in a high-impedance state. In some instances, an undriven signal wire of the trio 440 may be driven or pulled to a voltage level that lies substantially halfway between the positive and negative voltage levels provided on driven signal wires. In some instances, an undriven signal wire of the trio 440 may have no current flowing through it. Drivers 408 in the transmitter 400 coupled to the signal wires of the trio 440 are controlled such that only one wire of the trio 440 is in each of three states (denoted as +1, −1, or 0) in each symbol interval.

In one example, the drivers 408 include unit-level current-mode drivers. In another example, the drivers 408 drive opposite polarity voltages on two signals transmitted on two signal wires of the trio 440 while the third signal wire is at high impedance and/or pulled to ground. For each transmitted symbol interval, at least one signal is in the undriven (0) state, while one signal is driven to the positive (+1 state) and one signal is driven to the negative (−1 state), such that the sum of current flowing to the receiver 420 is zero amperes. For each symbol, the state of at least one signal wire of the trio 440 is changed from the symbol transmitted in the preceding transmission interval.

In the transmitter 400, a mapper 402 may receive a 16-bit input data word 418, and the mapper 402 may map the input data word 418 to 7 symbols 412 for transmitting sequentially over the signal wires of the trio 440. An M-wire, N-phase encoder 406 configured for three-wire, three-phase encoding receives the 7 symbols 412 produced by the mapper one input symbol 414 at a time and computes the state of each signal wire of the trio 440 for each symbol interval, based on the immediately preceding state of the signal wires of the trio 440. The 7 symbols 412 may be serialized using parallel-to-serial converters 404, for example. The encoder 406 provides control signals 416 to define the outputs of the drivers 408. The encoder 406 selects the states of the signal wires of the trio 440 based on the input symbol 414 and the previous states of signal wires of the trio 440 and may provide control signals 416 to cause the drivers 408 to produce the desired signaling state on the trio 440.

The use of three-wire, three-phase encoding permits several bits to be encoded in a plurality of symbols where the bits per symbol is not an integer. In the example of a three-wire, three-phase system, there are 3 available combinations of 2 wires, which may be driven simultaneously, and 2 possible combinations of polarity on the simultaneously driven pair of wires, yielding 6 possible states. Since each transition occurs from a current state, 5 of the 6 states are available at every transition. With 5 states, $\log_2(5) \cong 2.32$ bits may be encoded per symbol transition. Accordingly, a mapper may accept a 16-bit word and convert it to a 7-symbol sequence because 7 symbols carrying 2.32 bits per symbol can encode 16.24 bits. In other words, a combination of seven symbols that encodes five states has $5^7$ (78,125) permutations. Accordingly, the 7 symbols may be used to encode the $2^{16}$ (65,536) permutations of 16 bits.

In the illustrated example, the receiver 420 includes comparators 422 and a decoder 424 that are configured to provide a digital representation of the state of each of three signal wires of the trio 440, as well as the change in the state of the three signal wires compared to the state transmitted in the previous symbol period. Seven consecutive states are assembled by serial-to-parallel convertors 426 and used to produce a set of 7 symbols to be processed by a demapper 428 to obtain 16 bits of data that may be buffered in a first-in-first-out (FIFO) storage device 430, which may be implemented using registers, for example.

Figure 5:
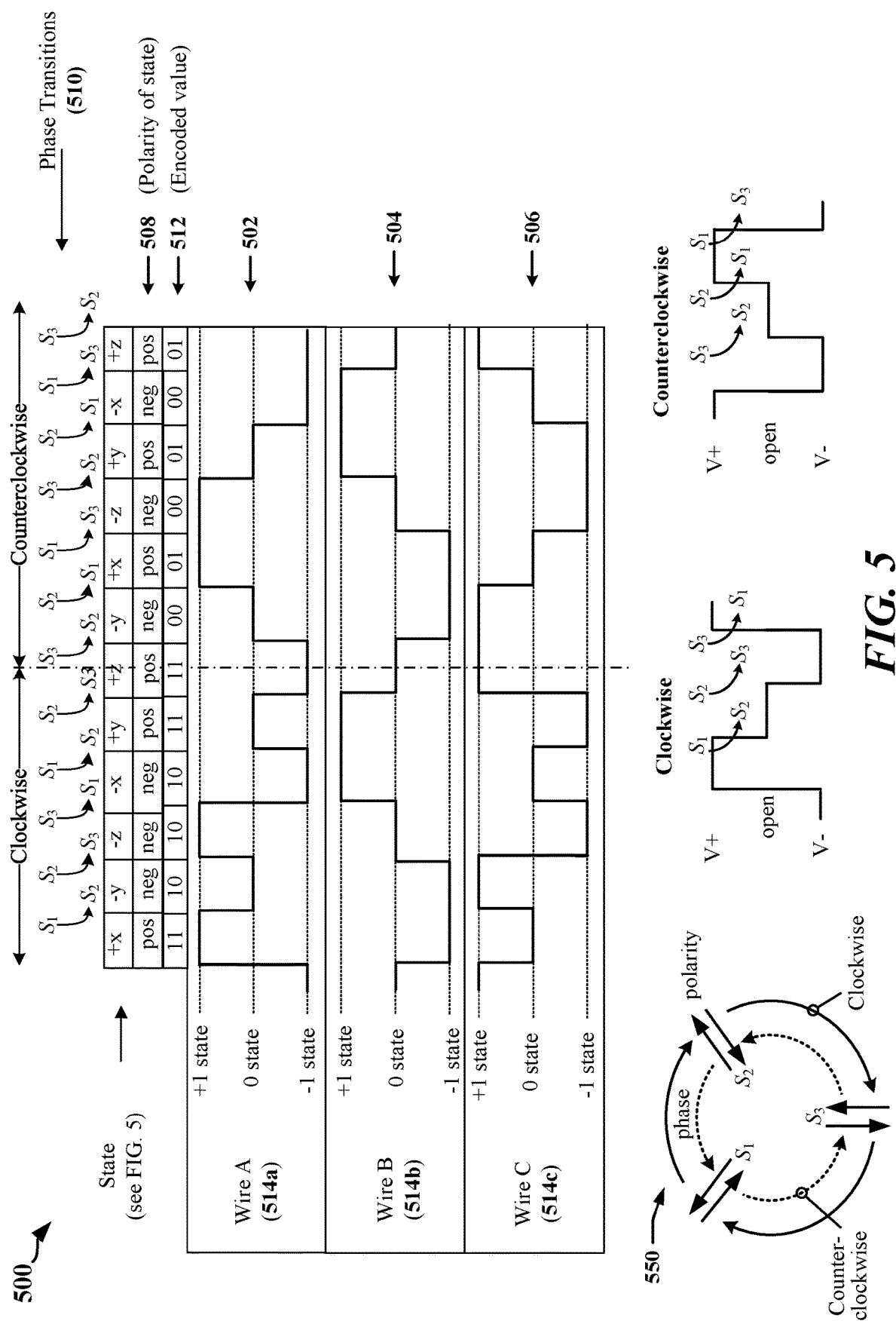
FIG. 5 illustrates signaling in an example of an N-phase polarity encoded interface.

FIG. 5 illustrates an example of signaling 500 employing a 3-phase modulation data-encoding scheme based on the circular state transition diagram 550. According to the data-encoding scheme, a 3-phase signal may rotate in two directions and may be transmitted on three wires 514a, 514b and 514c, identified as connectors A, B, and C. Each of the three signals is independently driven on the wires 514a, 514b, 514c. Each of the three signals includes the 3-phase signal, with each signal being 120 degrees out of phase relative to the other two signals. At any point in time, each of the three wires 514a, 514b, 514c is in a different one of the states {+1, 0, −1}. At any point in time, each of the three wires 514a, 514b, 514c in a 3-wire system is in a different state than the other two wires. When more than three conductors or wires are used, two or more pairs of wires may be in the same state. The illustrated encoding scheme may also encode information in the polarity of the two wires 514a, 514b and/or 514c that are actively driven to the +1 and −1 states. Polarity is indicated at 508 for the sequence of states depicted.

At any phase state in the illustrated 3-wire example, exactly two of the wires 514a, 514b, 514c carry a signal which is effectively a differential signal for that phase state, while the third wire 514a, 514b or 514c is undriven. The phase state for each wire 514a, 514b, 514c may be determined by voltage difference between the wire 514a, 514b or 514c and at least one other wire 514a, 514b and/or 514c, or by the direction of current flow, or lack of current flow, in the wire 514a, 514b or 514c. As shown in the state transition diagram 550, three phase states ($S_1$, $S_2$ and $S_3$) are defined. A signal may flow clockwise from phase state $S_1$ to phase state $S_2$, phase state $S_2$ to phase state $S_3$, and/or phase state $S_3$ to phase state $S_1$ and the signal may flow counterclockwise from phase state $S_1$ to phase state $S_3$, phase state $S_3$ to phase state $S_2$, and/or phase state $S_2$ to phase state $S_1$. For other values of N, transitions between the N states may optionally be defined according to a corresponding state diagram to obtain circular rotation between state transitions.

In the example of a 3-wire, 3-phase communication link, clockwise rotations ($S_1$ to $S_2$), ($S_2$ to $S_3$), and/or ($S_3$ to $S_1$) at a phase transition 510 (between states) may be used to encode a logic 1, while counterclockwise rotations ($S_1$ to $S_3$), ($S_3$ to $S_2$), and/or ($S_2$ to $S_1$) at the phase transition 510 may be used to encode a logic 0. Accordingly, a bit may be encoded at each transition by controlling whether the signal is "rotating" clockwise or counterclockwise. For example, a logic 1 may be encoded when the three wires 514a, 514b, 514c transition from phase state $S_1$ to phase state $S_2$ and a logic 0 may be encoded when the three wires 514a, 514b, 514c transition from phase state $S_1$ to phase state $S_3$. In the 3-wire example depicted, direction of rotation may be easily determined based on which of the three wires 514a, 514b, 514c is undriven before and after the transition.

Information may also be encoded in the polarity and/or changes of polarity of state 508 of the driven wires 514a, 514b, 514c, or in the direction of current flow or changes in the direction of current flow between two wires 514a, 514b, 514c. Signals 502, 504, and 506 illustrate voltage levels applied to wires 514a, 514b, 514c, respectively at each phase state in a 3-wire, 3-phase link. At any time, a first wire 514a, 514b, 514c is coupled to a more positive voltage (+V, for example), a second wire 514a, 514b, 514c is coupled to a more negative voltage (−V, for example), while the third wire 514a, 514b, 514c may be open-circuited. As such, one polarity encoding state may be determined by the current flow between the first and second wires 514a, 514b, 514c or the voltage polarities of the first and second wires 514a, 514b, 514c. In some embodiments, two bits of data 512 may be encoded in each phase transition 510. A decoder may determine the direction of signal phase rotation to obtain the first bit. The second bit may be determined based on the polarity difference between two of the signals 502, 504 and 506. In some instances, the second bit may be determined based on a change or lack of change in polarity of the differential signal transmitted on a pair of the wires 514a, 514b, 514c. The decoder having determined direction of rotation can determine the phase state and the polarity of the voltage applied between the two active wires 514a, 514b and/or 514c, or the direction of current flow through the two active wires 514a, 514b and/or 514c.

In the example of the 3-wire, 3-phase link described herein, one bit of data may be encoded in the rotation, or phase change in the 3-wire, 3-phase link, and an additional bit may be encoded in the polarity or changes in polarity of two driven wires. In certain embodiments, more than two bits can be encoded in each transition of a 3-wire, 3-phase encoding system by allowing transition to any of the possible states from a current state. Given three rotational phases and two polarities for each phase, 6 states are defined, such that 5 states are available from any current state. Accordingly, there may be $\log_2 (5)=2.32$ bits per symbol (transition) and the mapper may accept a 16-bit word and convert it to 7 symbols.

Figure 6:
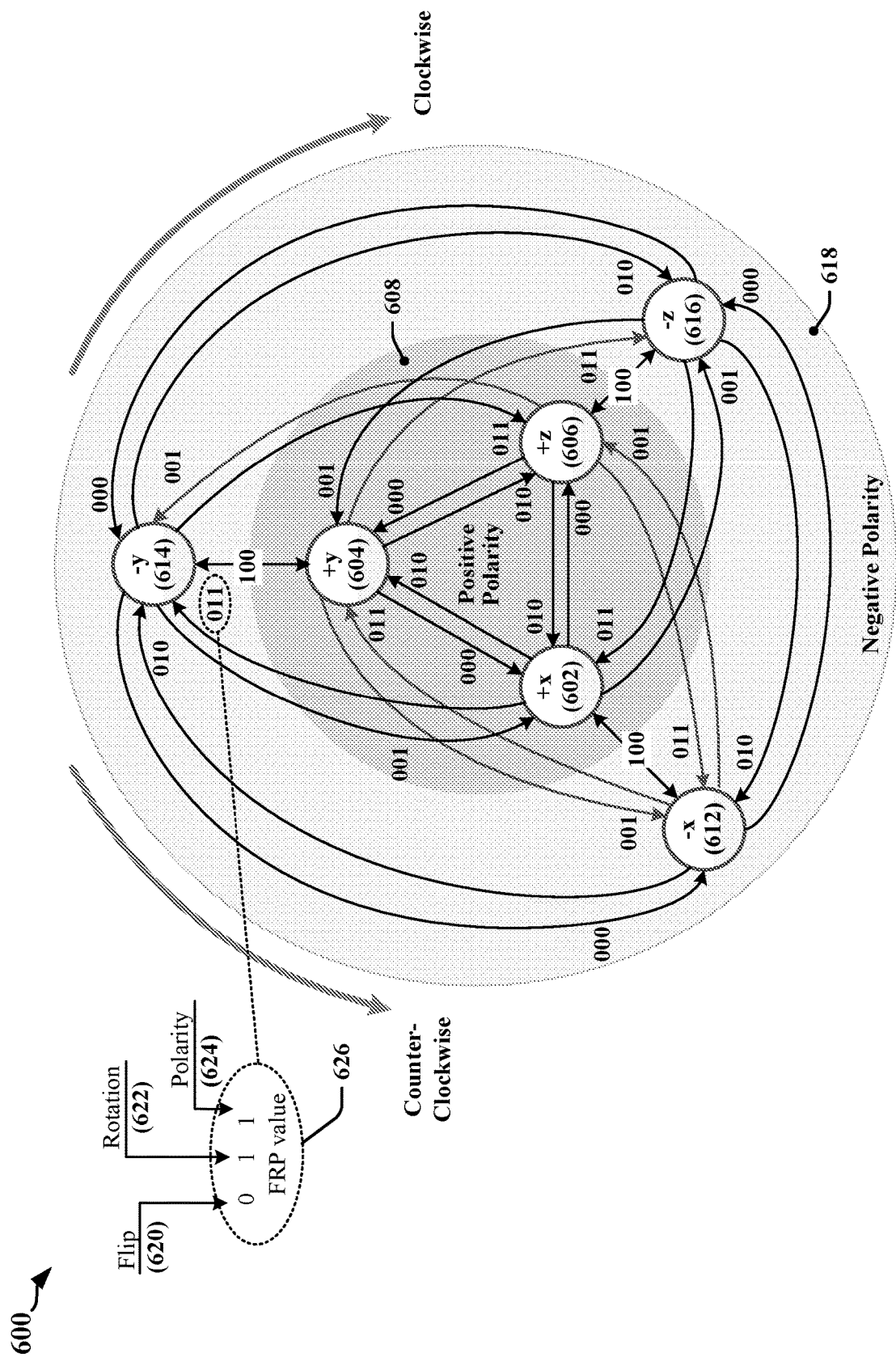
FIG. 6 is state diagram illustrating signaling states and transitions between signaling states in a C-PHY interface implemented in accordance with certain aspects disclosed herein.

FIG. 6 is a state transition diagram 600 illustrating the possible signaling states 602, 604, 606, 612, 614, 616 of the three wires in a 3-wire, 3-phase interface, including in a MIPI Alliance C-PHY high-speed mode interface for example. All possible transitions from each signaling state 602, 604, 606, 612, 614, 616 are illustrated. The transitions in the state transition diagram 600 can be represented by a Flip, Rotate, Polarity (FRP) symbol 626 that has one of the three-bit binary values in the set: {000, 001, 010, 011, 100}. The Rotation bit 622 of the FRP symbol 626 indicates the direction of phase rotation associated with a transition to a next state. The Polarity bit 624 of the FRP symbol 626 is set to binary 1 when a transition to a next state involves a change in polarity. When the Flip bit 620 of the FRP symbol 626 is set to binary 1, the Rotate and Polarity values may be ignored and/or zeroed. A flip represents a state transition that involves only a change in polarity. Accordingly, the phase of a 3-phase signal is not considered to be rotating when a flip occurs and the polarity bit is redundant when a flip occurs. The FRP symbol 626 corresponds to wire state changes for each transition. The state transition diagram 600 may be separated into an inner circle 608 that includes the positive polarity signaling states 602, 604, 606 and an outer circle 618 that encompasses the negative polarity signaling states 612, 614, 616.

Figure 7:
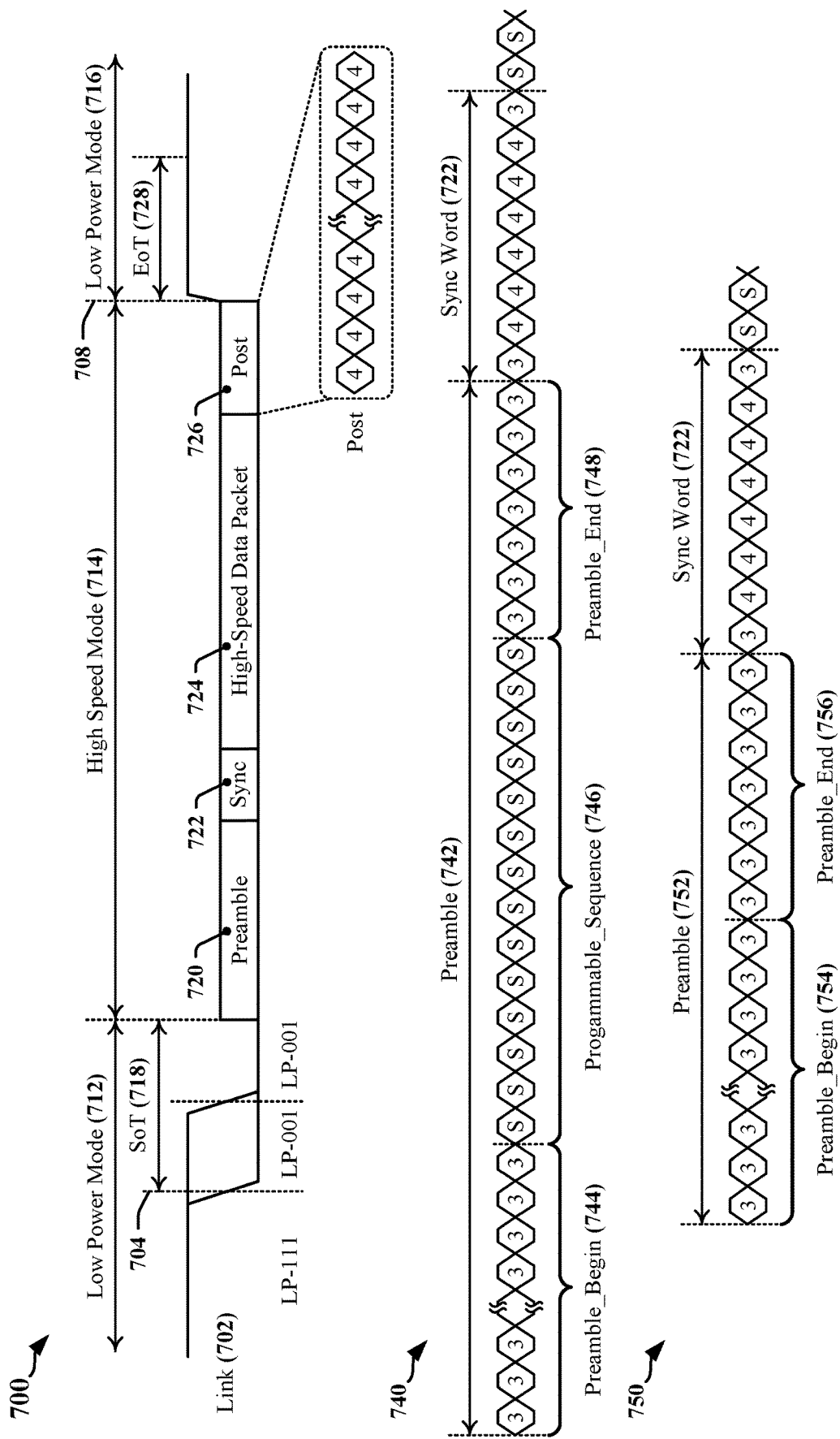
FIG. 7 illustrates certain aspects of data transmission in a C-PHY interface adapted in accordance with certain aspects disclosed herein.

FIG. 7 illustrates certain aspects of signaling on a data communication link 702 operated in accordance with C-PHY protocols. A high-speed transaction 700 is illustrated in which a C-PHY interface is initially configured for a low-power mode of operation 712. Commencing at a first time 704, the SoT sequence 718 is transmitted to switch the C-PHY interface to a low-voltage, high-speed mode of operation 714 in which data is transmitted. In the speed mode of operation 714, low-voltage differential (3-phase) signaling is used. Commencing at a second time 708, an EoT sequence 728 is transmitted to return the C-PHY interface to a low-power mode of operation 716. A POST pattern 726 is provided at the end of a high-speed data transmission to provide a reliable notification of the end of a high-speed burst to the receiver. In some instances, a receiver may determine that the C-PHY interface is configured for the low-power mode of operation 716 based on detection of signaling at the higher voltage levels associated with the low-power mode.

A C-PHY interface adapted according to certain aspects of this disclosure transitions from high-speed to low-power modes after transmission of a POST pattern 726 defined by C-PHY protocols. According to C-PHY protocols, the POST pattern 726 is provided at the end of a high-speed data transmission to provide a reliable notification of the end of the high-speed data transmission. The POST pattern 726 includes a series of unmapped code words (e.g., a sequence in which all symbols have a value of "4"). An unmapped code word may refer to a 7-symbol sequence that is not used to encode data. The SoT sequence 718 is transmitted to initiate the high-speed mode of operation 714, and in one example, may be defined as the sequence {LP-111, LP-001, LP-000}. The SoT sequence 718 may be preceded and followed by pauses in transmission.

A high-speed data transmission includes a data packet 724 that includes one or more 7-symbol sequences, each 7-symbol sequence encoding a data word. Encoding and decoding can be accomplished using mapping tables that associate each permutation of 16 bits with a combination of 7 symbols. Each symbol may be an FRP symbol that determines the next signaling state of a trio based on a current signaling state of the trio. state of defines. The C-PHY encoding scheme employs symbols and a 7-symbol combination yields a total of 78,125 permutations ($5^7$) of which 65,536 ($2^{16}$) are uniquely associated with one of the 16 bit possible values for the data word. Accordingly, 12,589 7-symbol combinations are nominally available for control use in control sequences.

C-PHY protocols define certain 7-symbol sequences that may be reserved for training, synchronization and control purposes. For example, a data packet 724 is preceded in transmission by a preamble 720 and a Sync Word 722 and the data transmission is terminated by the POST pattern 726. The preamble 720, Sync Word 722 and POST pattern 726 each include one or more reserved 7-symbol sequences. In the illustrated example, two initiation sequences 740 and 750 are shown. The initiation sequences 740 and 750 have different types of preambles.

In the first initiation sequence 740, the preamble 742 includes a programmable sequence 746 that may be used to configure, train or otherwise communicate control information to a receiver. The preamble 742 includes a Preamble_Begin sequence 744 followed by the programmable sequence 746 and completed by a Preamble_End sequence 748.

In the illustrated example, the Preamble_Begin sequence 744 includes repeated instances of a 7-symbol sequence in which every symbol has a value of '3'. The number of repetitions may be defined by protocol, by application or by configuration during calibration. The programmable sequence 746 includes some number of 7-symbol sequences that may include reserved symbols or encoded data words. The number, type and interpretation of the 7-symbol sequences in the programmable sequence 746 may be defined by protocol, by application or by configuration during calibration. In the illustrated example, the Preamble_End sequence 748 includes a single 7-symbol sequence in which every symbol has a value of '3'.

In the second initiation sequence 750, the preamble 752 includes a Preamble_Begin sequence 754 followed immediately by the Preamble_End sequence 756. In the illustrated example, the Preamble_Begin sequence 754 includes repeated instances of a 7-symbol sequence in which every symbol has a value of '3'. The number of repetitions may be defined by protocol, by application or by configuration during calibration. In the illustrated example, the Preamble_End sequence 756 includes a single 7-symbol sequence in which every symbol has a value of '3'.

Both initiation sequences 740 and 750 end with a Sync Word 722. In the illustrated example, the Preamble_End sequences 748, 756 include a single 7-symbol sequence that has a first and last transmitted symbol with a value of the '3' and 5 intervening symbols that have a value of '4'. The data packet 724 follows the Sync Word 722 in transmission. According to C-PHY protocols, a receiver is configured to recognize and respond to a Sync Word 722 after receiving 5 symbols that have a value of '4' followed by a symbol that has a value of the '3'.

In the illustrated example, the POST pattern 726 includes repeated instances of a 7-symbol sequence in which every symbol has a value of '4'. The number of repetitions may be defined by protocol, by application or by configuration during calibration.

The increased data throughput rates specified by later versions of the MIPI C-PHY interface specifications (e.g., MIPI C-PHY version 2.0 and later) can cause or exacerbate signal integrity issues. For example, loss of signal integrity can cause symbol recovery circuits at the receiver to generate corrupted symbol sequences or patterns, which may present complex challenges for physical layer circuits and modules (the RxPHY) in the receiver. In one example, a corruption can occur when one of the fixed patterns of symbols having a value of '4' in the POST pattern 726 flips to a different value due to signal distortion or a non-optimized Analog Front End (AFE) in the receiver or transmitter. In this latter example, corruption of the pattern of symbols in the POST pattern 726 may cause the RxPHY to misinterpret a transmitted POST pattern 726 as a Sync Word 722 when one symbol in a POST pattern 726 is flipped to a symbol that has a value of the '3'. Certain receivers may be configured to support Packet Delimiter Qualifier (PDQ) Sync patterns in accordance with C-PHY protocols that permit the Sync Word 722 to be transmitted at any time during the high-speed data transmission. Receipt of a PDQ Sync pattern causes the receiver to discard any ongoing data reception and begin receiving a new data packet 724.

A device operable in accordance with C-PHY protocols may be configured or adapted in accordance with certain aspects of this disclosure to ignore or discard corrupted symbols in a POST pattern. In one aspect, the device may be configured with a filter that can identify and flag a symbol that has a value of '3' that is received in the middle of a sequence of symbols in which the other symbols each have a value of '4'. The sequence of symbols that have a value of '4' may be included in a POST pattern and the flagged symbol may be regarded as a false or corrupted symbol. A Sync detector in the device may be configured to ignore or remove false or corrupted symbols and can prevent erroneous detections of a PDQ Sync pattern.

Figure 8:
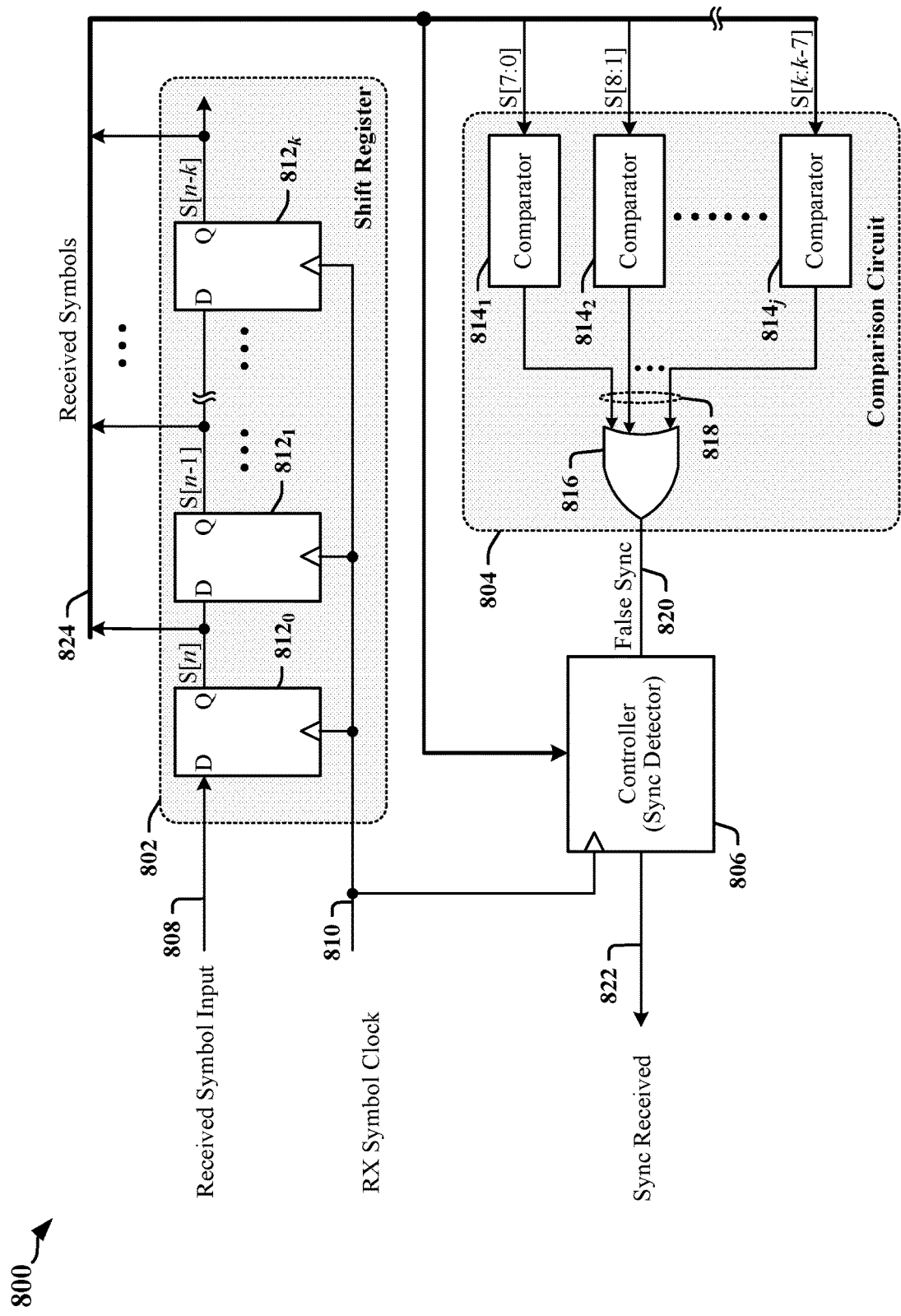
FIG. 8 illustrates certain aspects of a filter circuit provided in a device configured as a C-PHY receiver in accordance with certain aspects of this disclosure.

FIG. 8 illustrates certain aspects of a filter circuit 800 in a device configured as a C-PHY receiver in accordance with certain aspects of this disclosure. The filter circuit 800 may correspond in certain aspects to the receiver 420 of the C-PHY interface illustrated in FIG. 4. In one example, the filter circuit 800 can be configured to filter or discard any false symbol of value '3' that occurs in the middle of a sequence of symbols of value '4' in a POST pattern.

In the illustrated example, the filter circuit 800 includes a shift register 802, a comparison circuit 804 and a controller 806. The shift register 802 may be provided in a circuit that converts a stream of received symbols to a set of seven or more symbols that can be used to index a lookup table or demapper in order to decode data from the stream of received symbols. In one example, the shift register 802 may be used to implement the serial-to-parallel convertors 426 illustrated in FIG. 4. The shift register 802 has an input 808 through which a stream of 3-bit symbols is received from a decoder circuit. In one example, each symbol in the stream of 3-bit symbols is an FRP symbol that represents a transition in signaling state of a C-PHY trio. The 3-bit symbols propagate through a number (k+1) of 3-bit flipflops $812_0$-$812_k$, which are clocked by a receive symbol clock signal 810 that is typically provided by a clock recovery circuit. Edges in the receive symbol clock signal 810 symbol are generated in response to transitions in the signaling state of the C-PHY trio. In one example, the 3-bit flipflops $812_0$-$812_k$ are clocked by one edge in a receive symbol clock signal 810 that has a period that corresponds to the duration of a single symbol transmission interval. In another example, the 3-bit flipflops $812_0$-$812_k$ are clocked by both rising and falling edges in a half receive symbol clock signal 810 that toggles in response to each transition in signaling state of a C-PHY trio.

In the illustrated example, the outputs of the 3-bit flipflops $812_0$-$812_k$ contribute to a symbol bus 824 that has a width of (k+1)×3 bits. Referring again to FIG. 4, the demapper 428 is configured to receive a 7-symbol input, represented by 21 bits of the symbol bus 824 and k≥6. In some implementations, value of k greater than 6 is used to support or enable filtering performed in accordance with certain aspects of this disclosure.

Filtering decisions may be taken based on comparisons of symbols present on the symbol bus 824. The symbol bus 824 enables a latest-received symbol (S[n]) to be compared with any combination of the k preceding symbols. The symbol bus 824 enables filtering using comparisons of symbols (S[n+i]) with combinations of earlier or later received symbols. Filtering can be used to identify invalid or corrupted control patterns.

The illustrated comparison circuit 804 includes a number (j) of symbol comparators $814_1$-$814_j$. Each comparator $814_1$-$814_j$ is configured to compare 8 symbols. In one example, each comparator $814_1$-$814_j$ includes eight exclusive-OR based circuits that each compare respective bits of corresponding symbols in a pair of input symbol sequences. The outputs of the symbol comparators $814_1$-$814_j$ may be configured to indicate a result of the comparison involving the corresponding 8 input symbols. In one example, the result output by a symbol comparator $814_1$-$814_j$ may indicate that all of its input symbols are the same. In another example, the result output by a symbol comparator $814_1$-$814_j$ may indicate that all of its input symbols match a predefined or preconfigured value. In another example, the result output by a symbol comparator $814_1$-$814_j$ may indicate that its input matches a predefined or preconfigured combination of symbols.

In the illustrated example, the comparison circuit 804 is used to filter invalid Sync patterns caused by corrupted symbols received during a POST pattern. For example, a symbol in a POST pattern that is flipped to a symbol that has a value of the '3' can be detected using the illustrated filter circuit 800. Each of the symbol comparators $814_1$-$814_j$ is configured to identify a sequence of symbols that includes a symbol of value '3' that is followed by a sequence of seven sequentially-received symbols of value '4'. The sequence of value '4' symbols corresponds to a POST pattern and the occurrence of the seven sequentially-received symbols of value '4' indicates that the preceding symbol of value '3' belongs to a valid Sync pattern. Combinational logic—here an OR gate 816—is configured to generate a result signal 820 that indicates determination of a false Sync pattern when one of the outputs 818 of the symbol comparators $814_1$-$814_j$ indicates detection of a sequence of symbols that includes a symbol of value '3' that is followed by a sequence of seven sequentially-received symbols of value '4'.

The result signal 820 is provided to the controller 806, which is configured to detect Sync patterns. The controller 806 may block Sync pattern detection decisions when the result signal 820 indicates that a false Sync pattern has been detected. The controller 806 can ignore false PDQ Sync patterns when the result signal 820 indicates determination of a false Sync pattern.

Examples of Processing Circuits and Methods

Figure 9:
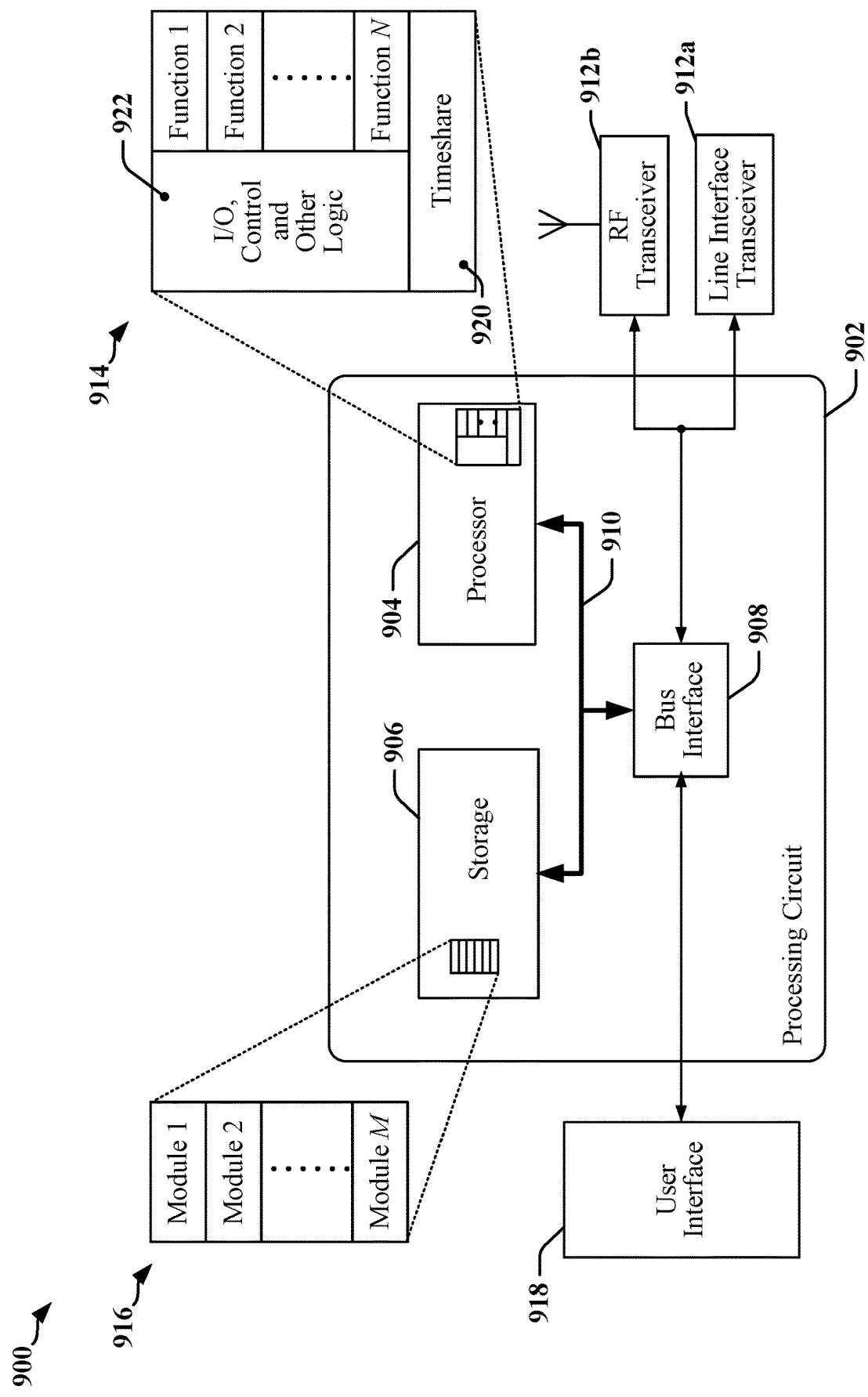
FIG. 9 illustrates one example of an apparatus employing a processing circuit that may be adapted in accordance with certain aspects disclosed herein.

FIG. 9 is a diagram illustrating an example of a hardware implementation for an apparatus 900. In some examples, the apparatus 900 may perform one or more functions disclosed herein. In accordance with various aspects of the disclosure, an element, or any portion of an element, or any combination of elements as disclosed herein may be implemented using a processing circuit 902. The processing circuit 902 may include one or more processors 904 that are controlled by some combination of hardware and software modules. Examples of processors 904 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 904 may include specialized processors that perform specific functions, and that may be configured, augmented or controlled by one of the software modules 916. The one or more processors 904 may be configured through a combination of software modules 916 loaded during initialization, and further configured by loading or unloading one or more software modules 916 during operation.

In the illustrated example, the processing circuit 902 may be implemented with a bus architecture, represented generally by the bus 910. The bus 910 may include any number of interconnecting buses and bridges depending on the specific application of the processing circuit 902 and the overall design constraints. The bus 910 links together various circuits including the one or more processors 904, and storage 906. Storage 906 may include memory devices and mass storage devices, and may be referred to herein as computer-readable media and/or processor-readable media. The bus 910 may also link various other circuits such as timing sources, timers, peripherals, voltage regulators, and power management circuits. A bus interface 908 may provide an interface between the bus 910 and one or more transceivers 912*a*, 912*b*. A transceiver 912*a*, 912*b* may be provided for each networking technology supported by the processing circuit. In some instances, multiple networking technologies may share some or all of the circuitry or processing modules found in a transceiver 912*a*, 912*b*. Each transceiver 912*a*, 912*b* provides a means for communicating with various other apparatus over a transmission medium. In one example, a transceiver 912*a* may be used to couple the apparatus 900 to a multi-wire bus. In another example, a transceiver 912*b* may be used to connect the apparatus 900 to a radio access network. Depending upon the nature of the apparatus 900, a user interface 918 (e.g., keypad, display, speaker, microphone, joystick) may also be provided, and may be communicatively coupled to the bus 910 directly or through the bus interface 908.

A processor 904 may be responsible for managing the bus 910 and for general processing that may include the execution of software stored in a computer-readable medium that may include the storage 906. In this respect, the processing circuit 902, including the processor 904, may be used to implement any of the methods, functions and techniques disclosed herein. The storage 906 may be used for storing data that is manipulated by the processor 904 when executing software, and the software may be configured to implement certain methods disclosed herein.

One or more processors 904 in the processing circuit 902 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 906 or in an external computer-readable medium. The external computer-readable medium and/or storage 906 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 906 may also include, by way of example, a carrier wave, a transmission line, and any other suitable medium for transmitting software and/or instructions that may be accessed and read by a computer. Computer-readable medium and/or the storage 906 may reside in the processing circuit 902, in the processor 904, external to the processing circuit 902, or be distributed across multiple entities including the processing circuit 902. The computer-readable medium and/or storage 906 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 906 may maintain software maintained and/or organized in loadable code segments, modules, applications, programs, etc., which may be referred to herein as software modules 916. Each of the software modules 916 may include instructions and data that, when installed or loaded on the processing circuit 902 and executed by the one or more processors 904, contribute to a run-time image 914 that controls the operation of the one or more processors 904. When executed, certain instructions may cause the processing circuit 902 to perform functions in accordance with certain methods, algorithms and processes described herein.

Some of the software modules 916 may be loaded during initialization of the processing circuit 902, and these software modules 916 may configure the processing circuit 902 to enable performance of the various functions disclosed herein. For example, some software modules 916 may configure internal devices and/or logic circuits 922 of the processor 904, and may manage access to external devices such as a transceiver 912*a*, 912*b*, the bus interface 908, the user interface 918, timers, mathematical coprocessors, and so on. The software modules 916 may include a control program and/or an operating system that interacts with interrupt handlers and device drivers, and that controls access to various resources provided by the processing circuit 902. The resources may include memory, processing time, access to a transceiver 912*a*, 912*b*, the user interface 918, and so on.

One or more processors 904 of the processing circuit 902 may be multifunctional, whereby some of the software modules 916 are loaded and configured to perform different functions or different instances of the same function. The one or more processors 904 may additionally be adapted to manage background tasks initiated in response to inputs from the user interface 918, the transceiver 912*a*, 912*b*, and device drivers, for example. To support the performance of multiple functions, the one or more processors 904 may be configured to provide a multitasking environment, whereby each of a plurality of functions is implemented as a set of tasks serviced by the one or more processors 904 as needed or desired. In one example, the multitasking environment may be implemented using a timesharing program 920 that passes control of a processor 904 between different tasks, whereby each task returns control of the one or more processors 904 to the timesharing program 920 upon completion of any outstanding operations and/or in response to an input such as an interrupt. When a task has control of the one or more processors 904, the processing circuit is effectively specialized for the purposes addressed by the function associated with the controlling task. The timesharing program 920 may include an operating system, a main loop that transfers control on a round-robin basis, a function that allocates control of the one or more processors 904 in accordance with a prioritization of the functions, and/or an interrupt driven main loop that responds to external events by providing control of the one or more processors 904 to a handling function.

Figure 10:
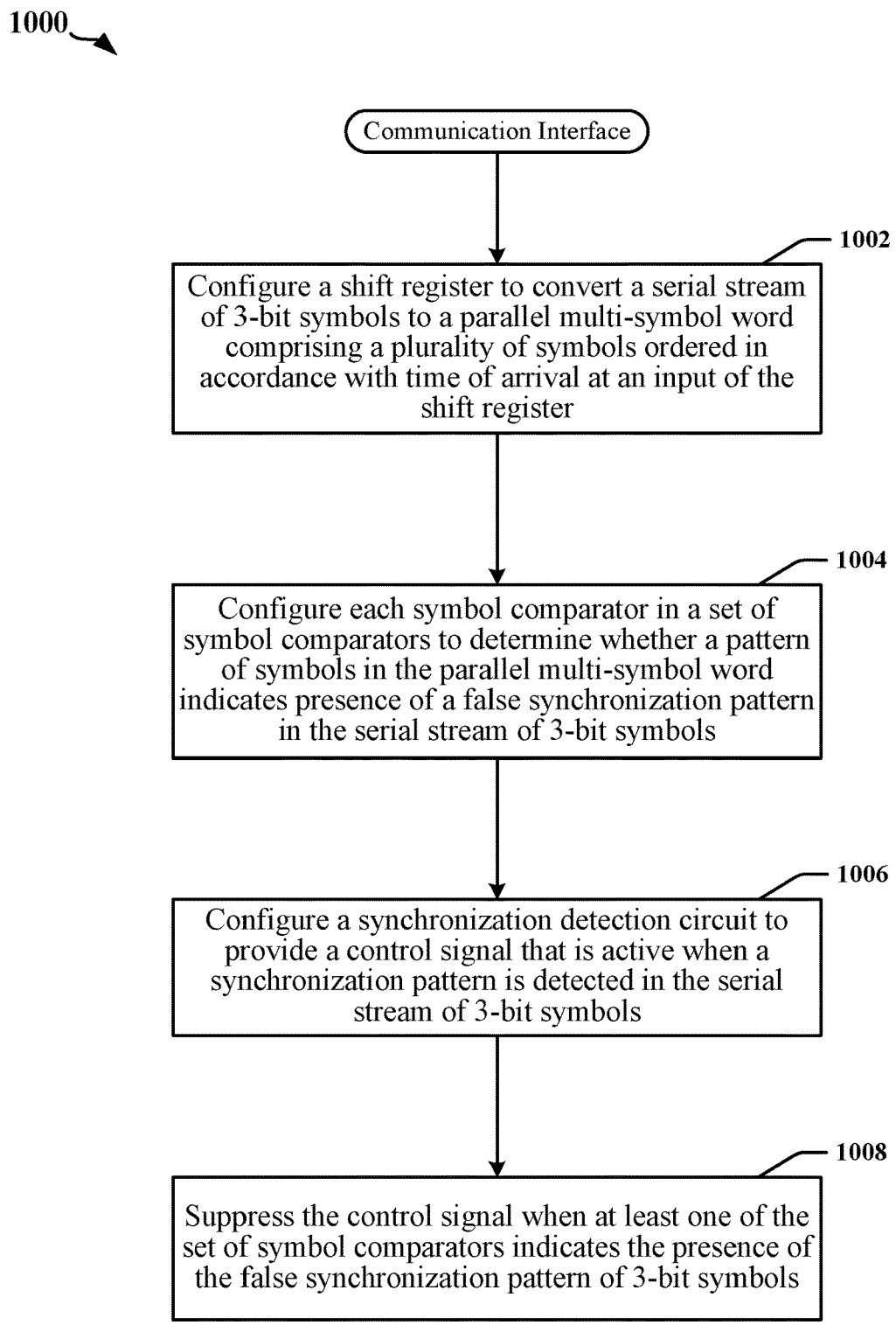
FIG. 10 is a flowchart that illustrates a method for operating a display or camera in a mobile communication device in accordance with certain aspects disclosed herein.

FIG. 10 is a flowchart 1000 of a method for operating a display or camera in a mobile communication device configured in accordance with certain aspects of this disclosure. In some instances, the method is implemented using a processor in a mobile communication device that includes a display or camera subsystem.

At block 1002 in the illustrated method, a shift register is configured to convert a serial stream of 3-bit symbols to a parallel multi-symbol word comprising a plurality of symbols ordered in accordance with time of arrival at an input of the shift register. At block 1004, each symbol comparator in a set of symbol comparators is configured to determine whether a pattern of symbols in the parallel multi-symbol word indicates presence of a false synchronization pattern in the serial stream of 3-bit symbols. At block 1006, a synchronization detection circuit is configured to provide a control signal that is active when a synchronization pattern is detected in the serial stream of 3-bit symbols. At block 1008, the control signal is suppressed when at least one of the set of symbol comparators indicates the presence of the false synchronization pattern of 3-bit symbols.

In certain implementations, each symbol in the serial stream of 3-bit symbols represents a transition in signaling state of a three-wire differential serial communication link. A synchronization pattern transmitted over the three-wire differential serial communication link may include a sequence of symbols that each have a first value followed in transmission by a symbol that has a second value. In one example, the false synchronization pattern includes a corrupted symbol that has the second value and the corrupted symbol may be followed in transmission by a sequence of symbols that each have the first value. In some examples, the corrupted symbol is included in a POST pattern configured in accordance with a C-PHY protocol.

In some implementations, the symbol comparators in the set of symbol comparators receive different sequences of the parallel multi-symbol word. In some implementations, a demapper may be configured to output a 16-bit data word that is mapped to seven symbols in the parallel multi-symbol word.

Figure 11:
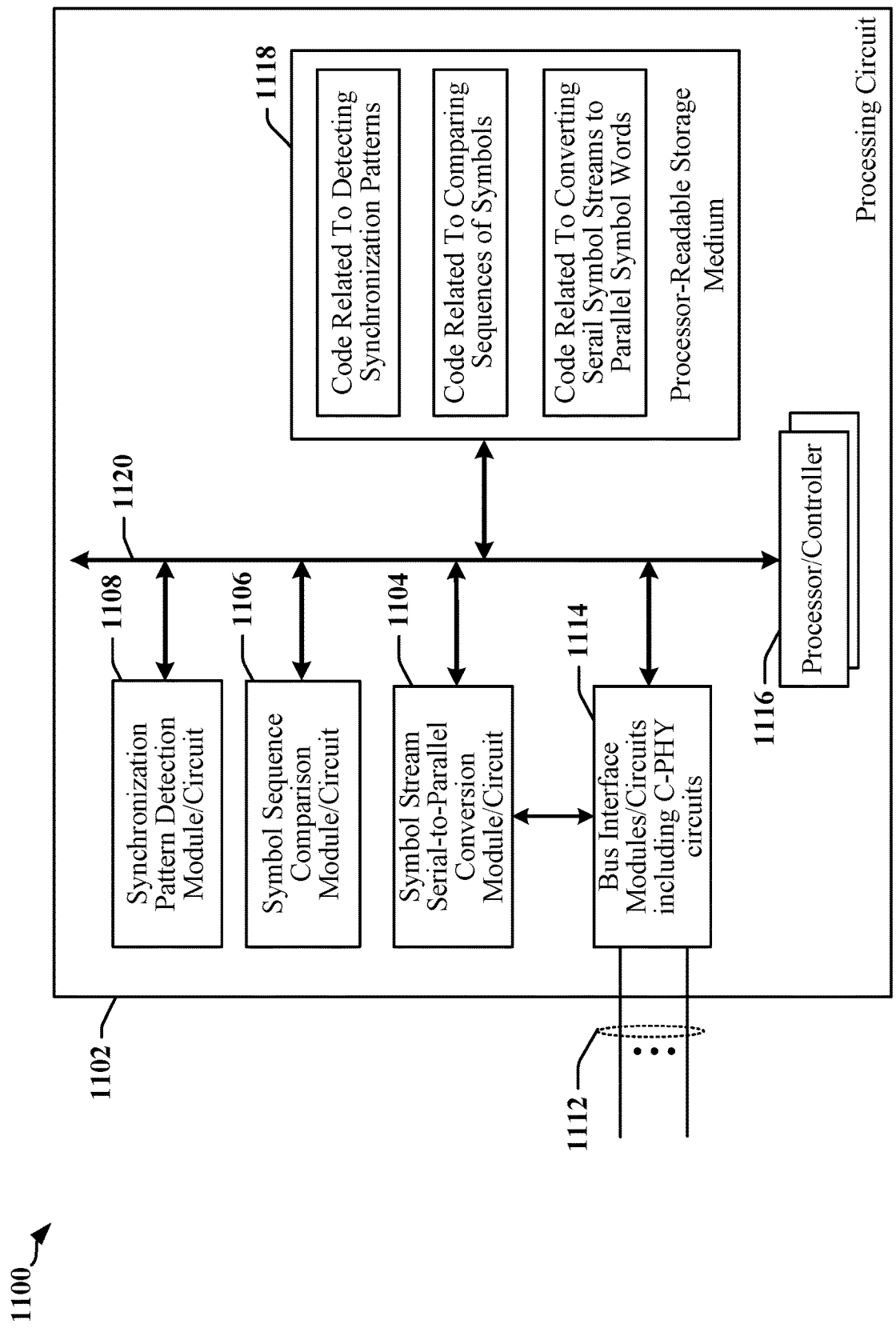
FIG. 11 illustrates a first example of a hardware implementation for a communication apparatus adapted in accordance with certain aspects disclosed herein.

FIG. 11 is a diagram illustrating a first example of a hardware implementation for an apparatus 1100 employing a processing circuit 1102. The processing circuit typically has one or more microprocessors, microcontrollers, digital signal processors, sequencers and/or state machines, represented generally by the processors 1116. The processing circuit 1102 may be implemented with a bus architecture, represented generally by the bus 1120. The bus 1120 may include any number of interconnecting buses and bridges depending on the specific application of the processing circuit 1102 and the overall design constraints. The bus 1120 links together various circuits including multiple processors 1116, the modules or circuits 1104, 1106 and 1108 and the processor-readable storage medium 1118. A bus interface circuit and/or module 1114 may be provided to support communications over multiple serial data links 1112. The bus 1120 may also link various other circuits such as timing sources, peripherals, voltage regulators, and power management circuits, which are well known in the art, and therefore, will not be described any further.

The processors 1116 may be responsible for general processing, including the execution of software, code and/or instructions stored on the processor-readable storage medium 1118. The processor-readable storage medium 1118 may include a non-transitory storage medium. The software, when executed by the processors 1116, causes the processing circuit 1102 to perform the various functions described supra for any particular apparatus. The processor-readable storage medium may be used for storing data that is manipulated by the processors 1116 when executing software. The processing circuit 1102 further includes at least one of the modules 1104, 1106 and 1108. The modules 1104, 1106 and 1108 may be software modules running in the processors 1116, resident/stored in the processor-readable storage medium 1118, one or more hardware modules coupled to the processors 1116, or some combination thereof. The modules 1104, 1106 and 1108 may include microcontroller instructions, state machine configuration parameters, or some combination thereof.

In one configuration, the apparatus 1100 includes modules and/or circuits 1104 adapted to convert streams of 3-bit symbols to parallel multibit words that represent a plurality of symbols, modules and/or circuits 1106 adapted to compare sequences of symbols, and modules and/or circuits 1108 adapted to detect synchronization patterns in a stream of symbols and to ignore false synchronization patterns.

The apparatus 1100 may include means for converting a serial stream of 3-bit symbols to a parallel multi-symbol word that includes a plurality of symbols ordered in accordance with time of arrival at an input of the means for converting the serial stream of 3-bit symbols to the parallel multi-symbol word; means for comparing sequences of symbols, the means for comparing the sequences of symbols including a set of symbol comparators in which each symbol comparator is configured to determine whether a pattern of symbols in the parallel multi-symbol word indicates presence of a false synchronization pattern in the serial stream of 3-bit symbols; and means for a detecting synchronization patterns configured to provide a control signal that is active when a synchronization pattern is detected in the serial stream of 3-bit symbols, and further configured to suppress the control signal when at least one of the set of symbol comparators indicates the presence of the false synchronization pattern of 3-bit symbols.

In certain implementations, each symbol in the serial stream of 3-bit symbols represents a transition in signaling state of a three-wire differential serial communication link. A synchronization pattern transmitted over the three-wire differential serial communication link may include a sequence of symbols that each have a first value followed in transmission by a symbol that has a second value. In one example, the false synchronization pattern includes a corrupted symbol that has the second value and the corrupted symbol may be followed in transmission by a sequence of symbols that each have the first value. In some examples, the corrupted symbol is included in a POST pattern configured in accordance with a C-PHY protocol.

In some instances, the symbol comparators in the set of symbol comparators receive different sequences of the parallel multi-symbol word.

In some implementations, apparatus 1100 includes demapping means configured to output a 16-bit data word that is mapped to seven symbols in the parallel multi-symbol word.

In one example, the apparatus 1100 is configured to operate as a communication interface circuit that has a shift register configured to convert a serial stream of 3-bit symbols to a parallel multi-symbol word that includes a plurality of symbols ordered in accordance with time of arrival at an input of the shift register; a set of symbol comparators, each symbol comparator being configured to determine whether a pattern of symbols in the parallel multi-symbol word indicates presence of a false synchronization pattern in the serial stream of 3-bit symbols; and a synchronization detection circuit configured to provide a control signal that is active when a synchronization pattern is detected in the serial stream of 3-bit symbols, and further configured to suppress the control signal when at least one of the set of symbol comparators indicates the presence of the false synchronization pattern of 3-bit symbols.

In some implementations, each symbol in the serial stream of 3-bit symbols represents a transition in signaling state of a three-wire differential serial communication link. A synchronization pattern transmitted over the three-wire differential serial communication link may include a sequence of symbols that each have a first value followed in transmission by a symbol that has a second value. In one example, the false synchronization pattern includes a corrupted symbol that has the second value and the corrupted symbol may be followed in transmission by a sequence of symbols that each have the first value. In some examples, the corrupted symbol is included in a POST pattern configured in accordance with a C-PHY protocol. In some examples, the symbol comparators in the set of symbol comparators receive different sequences of the parallel multi-symbol word.

In certain implementations, the apparatus 1100 includes a demapper that may be configured to output a 16-bit data word that is mapped to seven symbols in the parallel multi-symbol word.

The processor-readable storage medium 1118 may include instructions that cause the processing circuit 1102 to configure a shift register to convert a serial stream of 3-bit symbols to a parallel multi-symbol word that includes a plurality of symbols ordered in accordance with time of arrival at an input of the shift register; configure each symbol comparator in a set of symbol comparators to determine whether a pattern of symbols in the parallel multi-symbol word indicates presence of a false synchronization pattern in the serial stream of 3-bit symbols; configure a synchronization detection circuit to provide a control signal that is active when a synchronization pattern is detected in the serial stream of 3-bit symbols; and suppress the control signal when at least one of the set of symbol comparators indicates the presence of the false synchronization pattern of 3-bit symbols.

In some implementations, each symbol in the serial stream of 3-bit symbols represents a transition in signaling state of a three-wire differential serial communication link. A synchronization pattern transmitted over the three-wire differential serial communication link may include a sequence of symbols that each have a first value followed in transmission by a symbol that has a second value. In one example, the false synchronization pattern includes a corrupted symbol that has the second value and the corrupted symbol may be followed in transmission by a sequence of symbols that each have the first value. In some examples, the corrupted symbol is included in a POST pattern configured in accordance with a C-PHY protocol. In some examples, the symbol comparators in the set of symbol comparators receive different sequences of the parallel multi-symbol word.

In certain implementations, the processor-readable storage medium 1118 includes code that cause the processing circuit 1102 to output a 16-bit data word that is mapped to seven symbols in the parallel multi-symbol word. The processing circuit 1102 may use a demapper to output the 16-bit data word.

Some implementation examples are described in the following numbered clauses:

1. A communication interface circuit, comprising: a shift register configured to convert a serial stream of 3-bit symbols to a parallel multi-symbol word comprising a plurality of symbols ordered in accordance with time of arrival at an input of the shift register; a set of symbol comparators, each symbol comparator being configured to determine whether a pattern of symbols in the parallel multi-symbol word indicates presence of a false synchronization pattern in the serial stream of 3-bit symbols; and a synchronization detection circuit configured to provide a control signal that is active when a synchronization pattern is detected in the serial stream of 3-bit symbols, and further configured to suppress the control signal when at least one of the set of symbol comparators indicates the presence of the false synchronization pattern of 3-bit symbols.
2. The communication interface circuit as described in clause 1, wherein each symbol in the serial stream of 3-bit symbols represents a transition in signaling state of a three-wire differential serial communication link.
3. The communication interface circuit as described in clause 2, wherein a synchronization pattern transmitted over the three-wire differential serial communication link comprises a sequence of symbols that each have a first value followed in transmission by a symbol that has a second value.
4. The communication interface circuit as described in clause 3, wherein the false synchronization pattern comprises a corrupted symbol that has the second value.
5. The communication interface circuit as described in clause 4, wherein the corrupted symbol is followed in transmission by a sequence of symbols that each have the first value.
6. The communication interface circuit as described in any of clauses 4 or clause 5, wherein the corrupted symbol is included in a POST pattern configured in accordance with a C-PHY protocol.
7. The communication interface circuit as described in any of clauses 1-6, wherein the symbol comparators in the set of symbol comparators receive different sequences of the parallel multi-symbol word.
8. The communication interface circuit as described in any of clauses 1-7, further comprising: a demapper configured to output a 16-bit data word that is mapped to seven symbols in the parallel multi-symbol word.
9. A method for operating a display or camera in a mobile communication device, comprising configuring a shift register to convert a serial stream of 3-bit symbols to a parallel multi-symbol word comprising a plurality of symbols ordered in accordance with time of arrival at an input of the shift register; configuring each symbol comparator in a set of symbol comparators to determine whether a pattern of symbols in the parallel multi-symbol word indicates presence of a false synchronization pattern in the serial stream of 3-bit symbols; configuring a synchronization detection circuit to provide a control signal that is active when a synchronization pattern is detected in the serial stream of 3-bit symbols; and suppressing the control signal when at least one of the set of symbol comparators indicates the presence of the false synchronization pattern of 3-bit symbols.
10. The method as described in clause 9, wherein each symbol in the serial stream of 3-bit symbols represents a transition in signaling state of a three-wire differential serial communication link.
11. The method as described in clause 10, wherein a synchronization pattern transmitted over the three-wire differential serial communication link comprises a sequence of symbols that each have a first value followed in transmission by a symbol that has a second value.

12. The method as described in clause 11, wherein the false synchronization pattern comprises a corrupted symbol that has the second value.

13. The method as described in clause 12, wherein the corrupted symbol is followed in transmission by a sequence of symbols that each have the first value.

14. The method as described in any of clauses 12 or clause 13, wherein the corrupted symbol is included in a POST pattern configured in accordance with a C-PHY protocol.

15. The method as described in any of clauses 8-14, wherein the symbol comparators in the set of symbol comparators receive different subsets of the parallel multi-symbol word.

16. The method as described in any of clauses 8-15, further comprising: using a demapper to output a 16-bit data word that is mapped to seven symbols in the parallel multi-symbol word.

17. An apparatus, comprising: means for converting a serial stream of 3-bit symbols to a parallel multi-symbol word comprising a plurality of symbols ordered in accordance with time of arrival at an input of the means for converting the serial stream of 3-bit symbols to the parallel multi-symbol word; means for comparing sequences of symbols, the means for comparing the sequences of symbols including a set of symbol comparators in which each symbol comparator is configured to determine whether a pattern of symbols in the parallel multi-symbol word indicates presence of a false synchronization pattern in the serial stream of 3-bit symbols; and means for a detecting synchronization patterns configured to provide a control signal that is active when a synchronization pattern is detected in the serial stream of 3-bit symbols, and further configured to suppress the control signal when at least one of the set of symbol comparators indicates the presence of the false synchronization pattern of 3-bit symbols.

18. The apparatus as described in clause 17, wherein each symbol in the serial stream of 3-bit symbols represents a transition in signaling state of a three-wire differential serial communication link.

19. The apparatus as described in clause 18, wherein a synchronization pattern transmitted over the three-wire differential serial communication link comprises a sequence of symbols that each have a first value followed in transmission by a symbol that has a second value.

20. The apparatus as described in clause 19, wherein the false synchronization pattern comprises a corrupted symbol that has the second value and that is followed in transmission by a sequence of symbols that each have the first value.

21. The apparatus as described in clause 20, wherein the corrupted symbol is included in a POST pattern configured in accordance with a C-PHY protocol.

22. The apparatus as described in any of clauses 17-21, wherein the symbol comparators in the set of symbol comparators receive different subsets of the parallel multi-symbol word.

23. The apparatus as described in any of clauses 17-22, further comprising: demapping means configured to output a 16-bit data word that is mapped to seven symbols in the parallel multi-symbol word.

24. A processor-readable storage medium comprising code for: configuring a shift register to convert a serial stream of 3-bit symbols to a parallel multi-symbol word comprising a plurality of symbols ordered in accordance with time of arrival at an input of the shift register; configuring each symbol comparator in a set of symbol comparators to determine whether a pattern of symbols in the parallel multi-symbol word indicates presence of a false synchronization pattern in the serial stream of 3-bit symbols; configuring a synchronization detection circuit to provide a control signal that is active when a synchronization pattern is detected in the serial stream of 3-bit symbols; and suppressing the control signal when at least one of the set of symbol comparators indicates the presence of the false synchronization pattern of 3-bit symbols.

25. The storage medium as described in clause 24, wherein each symbol in the serial stream of 3-bit symbols represents a transition in signaling state of a three-wire differential serial communication link.

26. The storage medium as described in clause 25, wherein a synchronization pattern transmitted over the three-wire differential serial communication link comprises a sequence of symbols that each have a first value followed in transmission by a symbol that has a second value.

27. The storage medium as described in clause 26, wherein the false synchronization pattern comprises a corrupted symbol that has the second value and that is followed in transmission by a sequence of symbols that each have the first value.

28. The storage medium as described in clause 27, wherein the corrupted symbol is included in a POST pattern configured in accordance with a C-PHY protocol.

29. The storage medium as described in any of clauses 24-28, wherein the symbol comparators in the set of symbol comparators receive different subsets of the parallel multi-symbol word.

30. The storage medium as described in any of clauses 24-29, further comprising code for: using a demapper to output a 16-bit data word that is mapped to seven symbols in the parallel multi-symbol word.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A communication interface circuit, comprising:
a shift register configured to convert a serial stream of 3-bit symbols to a parallel multi-symbol word comprising a plurality of symbols ordered in accordance with time of arrival at an input of the shift register;
a set of symbol comparators, each symbol comparator being configured to determine whether a pattern of symbols in the parallel multi-symbol word indicates presence of a false synchronization pattern in the serial stream of 3-bit symbols; and
a synchronization detection circuit configured to provide a control signal that is active when a synchronization pattern is detected in the serial stream of 3-bit symbols, and further configured to suppress the control signal when at least one of the set of symbol comparators indicates the presence of the false synchronization pattern of 3-bit symbols.

2. The communication interface circuit of claim 1, wherein each symbol in the serial stream of 3-bit symbols represents a transition in signaling state of a three-wire differential serial communication link.

3. The communication interface circuit of claim 2, wherein a synchronization pattern transmitted over the three-wire differential serial communication link comprises a sequence of symbols that each have a first value followed in transmission by a symbol that has a second value.

4. The communication interface circuit of claim 3, wherein the false synchronization pattern comprises a corrupted symbol that has the second value.

5. The communication interface circuit of claim 4, wherein the corrupted symbol is followed in transmission by a sequence of symbols that each have the first value.

6. The communication interface circuit of claim 4, wherein the corrupted symbol is included in a POST pattern configured in accordance with a C-PHY protocol.

7. The communication interface circuit of claim 1, wherein the symbol comparators in the set of symbol comparators receive different sequences of the parallel multi-symbol word.

8. The communication interface circuit of claim 1, further comprising:
a demapper configured to output a 16-bit data word that is mapped to seven symbols in the parallel multi-symbol word.

9. A method for operating a display or camera in a mobile communication device, comprising:
configuring a shift register to convert a serial stream of 3-bit symbols to a parallel multi-symbol word comprising a plurality of symbols ordered in accordance with time of arrival at an input of the shift register;
configuring each symbol comparator in a set of symbol comparators to determine whether a pattern of symbols in the parallel multi-symbol word indicates presence of a false synchronization pattern in the serial stream of 3-bit symbols;
configuring a synchronization detection circuit to provide a control signal that is active when a synchronization pattern is detected in the serial stream of 3-bit symbols; and
suppressing the control signal when at least one of the set of symbol comparators indicates the presence of the false synchronization pattern of 3-bit symbols.

10. The method of claim 9, wherein each symbol in the serial stream of 3-bit symbols represents a transition in signaling state of a three-wire differential serial communication link.

11. The method of claim 10, wherein a synchronization pattern transmitted over the three-wire differential serial communication link comprises a sequence of symbols that each have a first value followed in transmission by a symbol that has a second value.

12. The method of claim 11, wherein the false synchronization pattern comprises a corrupted symbol that has the second value.

13. The method of claim 12, wherein the corrupted symbol is followed in transmission by a sequence of symbols that each have the first value.

14. The method of claim 12, wherein the corrupted symbol is included in a POST pattern configured in accordance with a C-PHY protocol.

15. The method of claim 9, wherein the symbol comparators in the set of symbol comparators receive different subsets of the parallel multi-symbol word.

16. The method of claim 9, further comprising:
using a demapper to output a 16-bit data word that is mapped to seven symbols in the parallel multi-symbol word.

17. An apparatus, comprising:
means for converting a serial stream of 3-bit symbols to a parallel multi-symbol word comprising a plurality of symbols ordered in accordance with time of arrival at an input of the means for converting the serial stream of 3-bit symbols to the parallel multi-symbol word;
means for comparing sequences of symbols, including a set of symbol comparators in which each symbol comparator is configured to determine whether a pattern of symbols in the parallel multi-symbol word indicates presence of a false synchronization pattern in the serial stream of 3-bit symbols; and
means for detecting synchronization patterns configured to provide a control signal that is active when a synchronization pattern is detected in the serial stream of 3-bit symbols, and further configured to suppress the control signal when at least one of the set of symbol comparators indicates the presence of the false synchronization pattern of 3-bit symbols.

18. The apparatus of claim 17, wherein each symbol in the serial stream of 3-bit symbols represents a transition in signaling state of a three-wire differential serial communication link.

19. The apparatus of claim 18, wherein a synchronization pattern transmitted over the three-wire differential serial communication link comprises a sequence of symbols that each have a first value followed in transmission by a symbol that has a second value.

20. The apparatus of claim 19, wherein the false synchronization pattern comprises a corrupted symbol that has the second value and that is followed in transmission by a sequence of symbols that each have the first value.

21. The apparatus of claim 20, wherein the corrupted symbol is included in a POST pattern configured in accordance with a C-PHY protocol.

22. The apparatus of claim 17, wherein the symbol comparators in the set of symbol comparators receive different subsets of the parallel multi-symbol word.

23. The apparatus of claim 17, further comprising:
demapping means configured to output a 16-bit data word that is mapped to seven symbols in the parallel multi-symbol word.

24. A non-transitory processor-readable storage medium comprising code configured to cause a processing circuit to:
configure a shift register to convert a serial stream of 3-bit symbols to a parallel multi-symbol word comprising a plurality of symbols ordered in accordance with time of arrival at an input of the shift register;
configure each symbol comparator in a set of symbol comparators to determine whether a pattern of symbols in the parallel multi-symbol word indicates presence of a false synchronization pattern in the serial stream of 3-bit symbols;
configure a synchronization detection circuit to provide a control signal that is active when a synchronization pattern is detected in the serial stream of 3-bit symbols; and
suppress the control signal when at least one of the set of symbol comparators indicates the presence of the false synchronization pattern of 3-bit symbols.

25. The non-transitory processor-readable storage medium of claim 24, wherein each symbol in the serial stream of 3-bit symbols represents a transition in signaling state of a three-wire differential serial communication link.

26. The non-transitory processor-readable storage medium of claim 25, wherein a synchronization pattern transmitted over the three-wire differential serial communication link comprises a sequence of symbols that each have a first value followed in transmission by a symbol that has a second value.

27. The non-transitory processor-readable storage medium of claim 26, wherein the false synchronization pattern comprises a corrupted symbol that has the second value and that is followed in transmission by a sequence of symbols that each have the first value.

28. The non-transitory processor-readable storage medium of claim 27, wherein the corrupted symbol is included in a POST pattern configured in accordance with a C-PHY protocol.

29. The non-transitory processor-readable storage medium of claim 24, wherein the symbol comparators in the set of symbol comparators receive different subsets of the parallel multi-symbol word.

30. The non-transitory processor-readable storage medium of claim 24, comprising further code that is configured to cause the processing circuit to:
use a demapper to output a 16-bit data word that is mapped to seven symbols in the parallel multi-symbol word.

* * * * *